(12) United States Patent
Knotts

(10) Patent No.: US 12,020,105 B2
(45) Date of Patent: Jun. 25, 2024

(54) RADIO-FREQUENCY IDENTIFICATION (RFID) CAPACITANCE LIQUID MEASUREMENT TAG SYSTEM

(71) Applicant: Daniel Knotts, Atlanta, GA (US)

(72) Inventor: Daniel Knotts, Atlanta, GA (US)

( * ) Notice: Subject to any disclaimer, the term of this patent is extended or adjusted under 35 U.S.C. 154(b) by 73 days.

(21) Appl. No.: 17/739,998

(22) Filed: May 9, 2022

(65) Prior Publication Data

US 2022/0358342 A1 Nov. 10, 2022

Related U.S. Application Data

(60) Provisional application No. 63/186,045, filed on May 7, 2021.

(51) Int. Cl.
| | | |
|---|---|---|
| *G06K 19/077* | (2006.01) | |
| *G01F 22/00* | (2006.01) | |
| *G06K 19/07* | (2006.01) | |

(52) U.S. Cl.
CPC ....... *G06K 19/07788* (2013.01); *G01F 22/00* (2013.01); *G06K 19/0709* (2013.01); *G06K 19/0723* (2013.01); *G06K 19/0776* (2013.01)

(58) Field of Classification Search
None
See application file for complete search history.

(56) References Cited

U.S. PATENT DOCUMENTS

| 8,453,878 B2 | 6/2013 | Palmquist |
| 8,734,376 B2 | 5/2014 | Simpson et al. |
| 2011/0259960 A1* | 10/2011 | Baarman ............ G06K 19/0717 235/440 |
| 2013/0276533 A1 | 10/2013 | Wilder et al. |

(Continued)

FOREIGN PATENT DOCUMENTS

| CN | 115183841 A | * 10/2022 |
| DE | 102020100397 A1 | * 7/2021 |

(Continued)

OTHER PUBLICATIONS

Machine translation of DE102020100397, retrieved from EPO on Jun. 17, 2023 (Year: 2023).*

(Continued)

*Primary Examiner* — Suezu Ellis
(74) *Attorney, Agent, or Firm* — GIBRALTAR CONSULTING LLC; Tariq S. Najee-Ullah

(57) ABSTRACT

The system and techniques disclose herein describe a radio-frequency identification (RFID) capacitance liquid measurement and tag (RCLMT) system for detecting a volume of liquid in a container (liquid level detection), for example an amount of wine inside of a wine bottle. The RCLMT system includes a RFID chip, flexible printed circuit board (PCB), capacitive strips, and adhesive which implements a RFID tag-based sensor that advantageously uses low power and has low cost. Further, a user platform, including the RCLMT system and computer software applications (apps) and a backend system (e.g., cloud service) is described herein. The RCLMT system acts as a passive liquid level detection sensor, which enables the amount of a liquid beverage, such as alcohol, that is inside of a container to be automatically and accurately ascertained.

19 Claims, 26 Drawing Sheets

(56) References Cited

U.S. PATENT DOCUMENTS

2017/0328761 A1* 11/2017 Schwartz .............. G01F 23/266
2020/0226899 A1    7/2020 Grunwald

FOREIGN PATENT DOCUMENTS

EP       3244175 A1   11/2017
WO    2001043096 A3    2/2002

OTHER PUBLICATIONS

Machine translation of CN115183841, retrieved from FIT on Jun. 17, 2023 (Year: 2023).*
"Fluid Level Sensing Application using Battery Free Wireless Sensors", ON Semiconductor, Found Date: Nov. 23, 2020, https://www.youtube.com/watch?v=S_iP-TtR1Qc.
Bhattacharyya, "RFID Tag Antenna Based Sensing: Does your Beverage Glass need a Refill?", Massachusetts Institute of Technology, Founded Date: Nov. 23, 2020, 8 pages.

* cited by examiner

Assign Stickers

| Sticker ID | Drink Name | Drink Type | Price ($) |
|---|---|---|---|
| | Captain Morgan | Rum | 145 |
| | Absolut | Vodka | 120 |
| ▶ | Tanqueray | Gin | 114 |

FIG. 8

Bartender Insights

Filters: 3/16/2018; Shift (9 AM - 12 PM);...

| Employee Name | Amount poured (L) | Amount required (L) | Overpoured (L) |
|---|---|---|---|
| Jane Doe | 9 | 6 | 3 |
| John Doe | 7 | 6 | 1 |

FIG. 11

Bartender Insights

Filters: 3/16/2018; Shift (9 AM - 12 PM);...

| Employee Name ▲ | Amount poured (L) | Amount required (L) | Overpoured (L) |
|---|---|---|---|
| John Doe | 7 | 6 | 1 |
| Jane Doe | 9 | 6 | 3 |

FIG. 12

Inventory Insights

Filters: Inventory < 9 L

| Drink Name ▼ | Drink Type | Inventory Amount (L) | Sales ($) |
|---|---|---|---|
| Absolut | Vodka | 9 | 120 |
| Captain Morgan | Rum | 7 | 145 |
| Tanqueray | Gin | 1 | 114 |

FIG. 19

| Date/Time | Brand/Type/shot | Bar Station | Amount Prd. | Status |
|---|---|---|---|---|
| Sat 03/01 6:48:10 PM | Bicardi O Rum - DBL | 3 | 2.33 oz | |
| Sat 03/01 6:49:18 PM | Bulleit Whiskey - SNG | 3 | 1.12 oz | |
| Sat 03/01 6:49:32 PM | Bulleit Whiskey - SNG | 1 | 1.22 oz | |
| Sat 03/01 6:49:55 PM | Jack D Whiskey - SNG | 3 | 1.62 oz | alert |
| Sat 03/01 6:52:10 PM | Joel Sig Cab Wine - 1 | 2 | 4.03 oz | |
| Sat 03/01 6:53:29 PM | Jack D Whiskey - DBL | 2 | 2.08 oz | |
| Sat 03/01 6:54:37 PM | Titos Vodka - SNG | 3 | 1.38 oz | |
| Sat 03/01 6:55:52 PM | Bicardi O Rum - SNG | 1 | 1.70 oz | alert |

FIG. 22

Register as Bartender

Create Username

Create Password

Confirm Password

Register

FIG. 24

RADIO-FREQUENCY IDENTIFICATION (RFID) CAPACITANCE LIQUID MEASUREMENT TAG SYSTEM

FIELD OF DISCLOSURE

The present disclosure generally relates to systems using radio-frequency identification (RFID) tag antenna-based sensors that can be employed for various applications, such as liquid level detection, beverage inventory management, and the like.

BACKGROUND OF THE DISCLOSURE

In general, the hospitality industry faces a tremendous problem relating to loss of product. This problem arises frequently in the sale of expensive beverages such as wine and liquor. Moreover, the issue can be exacerbated in the face of additional factors that contribute to increased loss, such as employee (e.g., bartender) theft, over-pouring (e.g., accidental and/or intentional), and ineffective tracking of the lifecycle of inventory (e.g., managers manually tracking wine and liquor inventory).

Thus, mechanisms that can perform liquid level detection (e.g., determining the amount of a beverage remaining in glasses, liquor bottles, and the like) in an efficient and accurate manner can be an important tool in the hospitality industry. For instance, a sensor that detects liquid levels, as it pertains to beverages, can help in maintaining quality of service, efficient inventory management, and good approval ratings in bars, restaurants, hotels, and more. However, many approaches that are currently used to detect liquid levels are highly susceptible to human error (e.g., visual inspection) or employs cumbersome, complex (e.g., difficult to adopt and/or integrate) electronics to detect liquid levels that are not cost effective, particularly on a large scale (e.g., inventory including thousands of bottles).

BRIEF OVERVIEW

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 8 illustrates an example graphical user interface displaying real-time pour data that can be implemented by user platform shown in FIG. 5, according to one or more embodiments shown and described herein.

FIG. 11 illustrates examples of graphical user interfaces displaying various features that may be implemented by the user platform including the RFID capacitance liquid measurement tag system shown in FIG. 1, according to one or more embodiments shown and described herein.

FIG. 12 illustrates examples of graphical user interfaces displaying various features that may be implemented by the user platform including the RFID capacitance liquid measurement tag system shown in FIG. 1, according to one or more embodiments shown and described herein.

FIG. 19 illustrates examples of graphical user interfaces displaying various features that may be implemented by the user platform including the RFID capacitance liquid measurement tag system shown in FIG. 1, according to one or more embodiments shown and described herein.

FIG. 22 illustrates examples of graphical user interfaces displaying various features that may be implemented by the user platform including the RFID capacitance liquid measurement tag system shown in FIG. 1, according to one or more embodiments shown and described herein.

FIG. 24 illustrates examples of graphical user interfaces displaying various features that may be implemented by the user platform including the RFID capacitance liquid measurement tag system shown in FIG. 1, according to one or more embodiments shown and described herein.

DETAILED DESCRIPTION OF THE DISCLOSURE

Figure 1:
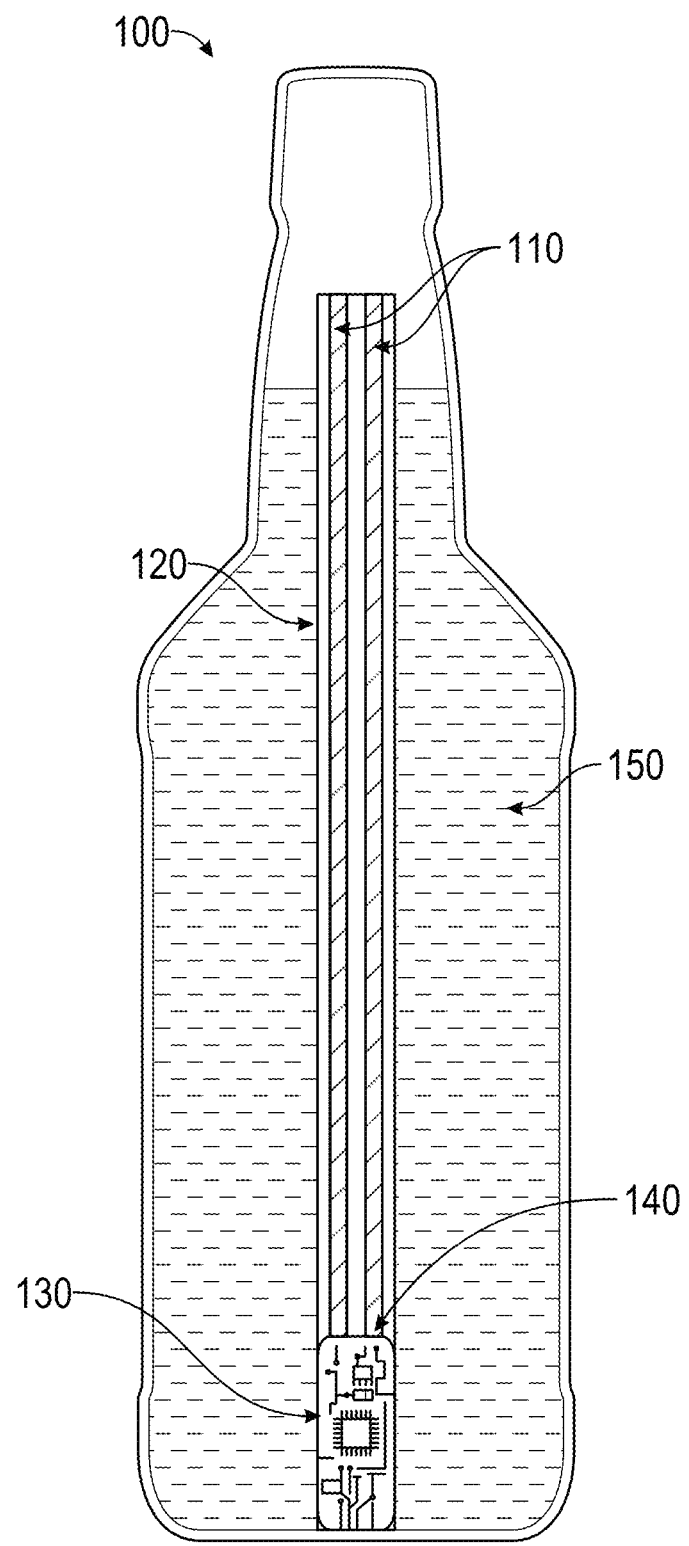
FIG. 1 depicts an example configuration of a radio-frequency identifier (RFID) capacitance liquid measurement tag system, according to one or more embodiments shown and described herein.

The present disclosure includes many aspects and features. Moreover, while many aspects and features relate to, and are described in, the context of portable beauty tool assembly for cosmetics, embodiments of the present disclosure are not limited to use only in this context. The present disclosure can be understood more readily by reference to the following detailed description of the disclosure and the Examples included therein.

Before the present articles, systems, apparatuses, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

With reference now to the drawings, and in particular FIG. 1 through FIG. 8 thereof, examples of liquid level detection and concepts thereof will be described.

The system and techniques disclosed herein can be described as a radio-frequency identification (RFID) capacitance liquid measurement and tag (RCLMT) system for detecting a volume of liquid in a container (also referred to herein as a liquid level), for example an amount of wine that is inside of a wine bottle. Further, a user platform, including the RCLMT system and computer software applications (apps) and a backend system (e.g., cloud service) is described herein.

Accordingly, by employing the RCLMT system as a passive liquid level detection sensor, the system enables the volume (or liquid level) of a liquid beverage, such as alcohol, that is inside of a container to be automatically and accurately ascertained. Further, in a broader sense, using the RCMLT system can be employed in monitoring the dispensing of a liquid beverage from a container (e.g., real-time pour data) and communicating this information to other networked devices. Therefore, the RCMLT system can be utilized to automatically track metrics of various factors that can impact loss of product, such as over-pouring of alcohol, and managing liquid beverage inventory (e.g., amount of alcohol remaining in the bottles stocked at the bar).

Referring now to FIG. 1, an example configuration of the RCLMT system 100 is shown. As disclosed herein, the RCMLT system 100 is implemented as a flexible disposable RFID capacitance liquid level detection sensor. In the illustrated example of FIG. 1, the RCMLT system 100 can be comprised of several components, including but not limited to: capacitive strips 110; an adhesive 120; a RFID chip 130; and a flexible printed circuit board (PCB) 140; and a container 150 (shown as a bottle in FIG. 1). The RFID chip 130 and flexible PCB 140 can be described as a RFID tag. For example, the RFID chip 130 and flexible PCB 140 can implement a transponder (or small device) that utilizes low-power radio waves to receive, store, and transmit data to nearby RFID readers (not shown in FIG. 1). Generally, RFID tags are comprised of the following main components: a microchip or integrated circuit (IC) (also referred to herein as RFID chip), an antenna, and a substrate or protective material layer that holds all the components together. According to the embodiments, the RFID tag (i.e., RFID chip 130 and flexible PCB 140) is a passive RFID tag that does not require an internal power source, but rather, is powered by the electromagnetic energy transmitted from the RFID reader. It should be appreciated that in alternative embodiments, the RFID tag of the RCMLT system 100 can be implemented as an active, semi-passive or battery-assisted passive (BAP) RFID tag. Additionally, the RFID tag of the RCMLT system 100 may operate in three frequency ranges: Ultra-High Frequency (UHF), High Frequency (HF), and Low Frequency (LF).

The container 150 can be a glass or plastic bottle, for example, or any material that allows the RFID tag (i.e., RFID chip 130 and flexible PCB 140) and the capacitive strips 100 to be affixed to its external surfaces and are widely available in various sizes and designs. Further, it should be understood that the RFID tag for the RCMLT system 100 may be implemented in a form factor that is different from the illustrated example, such as an inlays, informational/brand labels, hard tags, sticker, or fob.

As seen, the capacitive strips 110 are connected to the flexible PCB 140. The flexible PCB 140 can have the RFID chip 130 (also referred to herein as RFID integrated circuit) mounted thereto. The capacitive strips 110 can be constructed as two parallel elongated strips of a conductive material, such as electrodes. The capacitive strips 110 can be attached length-wise (e.g., height of bottle from base to neck) across an external surface of the container 150 such that the flexible PCB 140 is arranged at the base (or bottom) of the container 150 being level to a starting level of the liquid. Thus, when there is a large volume of a liquid beverage in the container 150 (e.g., high liquid level/container filled) the liquid contacts the capacitive strips 110 (through the container 150) for a distance that is approximately the length of the bottle, from the bottom of container 150 the to the top of the container 150. Conversely, when there is a small volume of a liquid beverage in the container 150 (e.g., low liquid level/container empty) the liquid contacts the capacitive strips 110 (through the container 150) for a shorter distance, close to the bottom of container 150. Restated, the capacitive strips 120 are activated by RF energy to act as a sensor to sense a volume of the liquid that is currently held within the container 150.

The adhesive 120 can be used to stably affix the capacitive strips 110 and RFID tag (i.e., flexible PCB 140 and the RFID chip 130) to the container 150. For example, the adhesive 120 can be a shielding copper tape that covers the capacitive strips 110, the RFID chip 130, and the flexible PCB 140 in a manner that applies the RFID tag to the container 150 and protects the aforementioned components from damage.

According to the embodiments, the RCMLT system 100 is configured to sense the volume of the liquid beverage (e.g., liquid level detection) through the container 150 using energy distributed through a certain radio wave frequency from the RFID reader and RFID antenna (not shown in FIG. 1). RFID antennas are configured to perform two very important functions: 1) transmit power to the RFID tag by activating them; and 2) receive data back from the activated RFID tags. In some cases, a single RFID antenna can activate and receive data from multiple RFID tags simultaneously. The RFID antennas may be physically connected to the RFID reader, for instance using a coaxial cable. Generally, RFID antennas have no intelligence and are controlled by the RFID reader.

In operation, a RFID antenna can propagate a cloud of radio frequency (RF) energy. When the RCMLT system 100 is proximate to the RFID antenna, and present in this cloud, the RFID tag (i.e., RFID chip 130 and flexible PCB 140) can be activated (e.g., powered on) by this RF energy. An RCMLT system 100 can be considered as being proximate to an RFID antenna when it is within a suitable RF range to support RF-based wireless communication. Examples of RF ranges that may be suitable for the RCMLT system 100 can include, but are not limited to: distances up to 12 meters for a passive RFID tags; distances up to 100 meters or more for active RFID tags; distances up to 1 meter for RFID tags operating at low-frequency and high-frequency; and distances between 10 to 20 feet for RFID tags operating at ultra-high frequency.

Subsequently, the RCMLT system 100 utilizes the power received from the RFID antenna to send current through the capacitive strips 110. As the current flows through the capacitive strips 110, an electric field is produced which enables the capacitive strips 110 (e.g., electrodes) to act as a sensor. For instance, in capacitive sensing, the capacitive strips 110 can generate and shape an electric field. Objects with a dielectric value, in this case the liquid within the container, affect the capacitance between the capacitive strips 110, which is detected (or sensed) via the capacitive strips 110. In addition, an analogue-to-digital (ADC) converter can be implemented via the flexible PCB 140. Thus, the flexible PCB 140 measures any change ($\Delta$) in the capacitance in the electric field between the capacitive strips 110 caused by the presence of the liquid, and converts this change into a digital data corresponding to a liquid level. In some implementations, an algorithm can be used to calculate, derive, or directly assign a capacitance variation, sensed by the RCMLT system 100, to a particular liquid level (or volume). Thereafter, the RFID tag of the RCMLT system 100 can transmit this value representing the detected liquid level for a liquid beverage inside of the container 150 back to the RFID reader using RFID technology. That is, the RFID tag transmits the digital data to the RFID reader such that the digital data can ultimately be displayed to a user (e.g., via a user interface of a software application) to visibly represent the volume of the liquid (or liquid level) currently held within the container 150.

By implementing an RFID tag-based sensor, the RCMLT system 100 realizes a low cost, low power (e.g., passively powered), small footprint, liquid level detection system. Furthermore, due to these characteristics, the RCMLT system 100 can be easily applied to a large inventory (e.g., hundreds or thousands) of containers holding liquid beverages, such as liquor/wine bottles, in order to obtain real-time liquid level data, thereby preventing over-pouring, theft, and miscalculation of inventory for bars, restaurants, concert venues, night clubs, cruise lines, and the like. using RFID technology. As alluded to above, the entire global hospitality industry faces a costly problem (e.g., costing $125 billion) due to loss of product caused by bartenders and other employees stealing, over-pouring (whether accidental or not), and managers not being able to track the lifecycle of their liquor inventory effectively. In some cases, this product loss leads to 25%-30% revenue loss for these businesses. The RCMLT system 100 and user platform (described in detail in reference to FIG. 5) can result in more visibility of how inventory is being used and also creates managerial action that ultimate mitigates these losses, and thereby increases revenue.

Figure 2A:
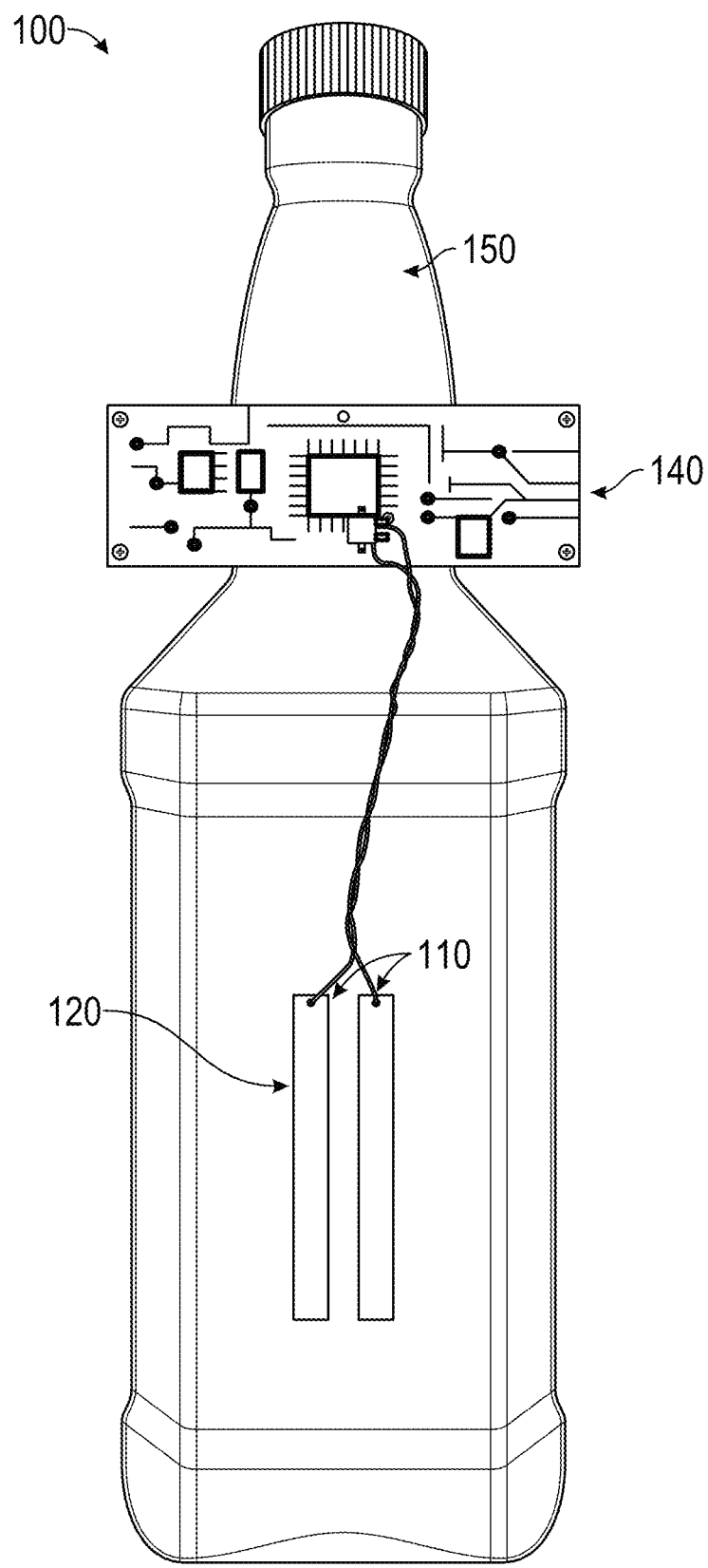
FIG. 2A illustrates an RFID capacitance liquid measurement tag system shown in FIG. 1, according to one or more embodiments shown and described herein.
Figure 2E:
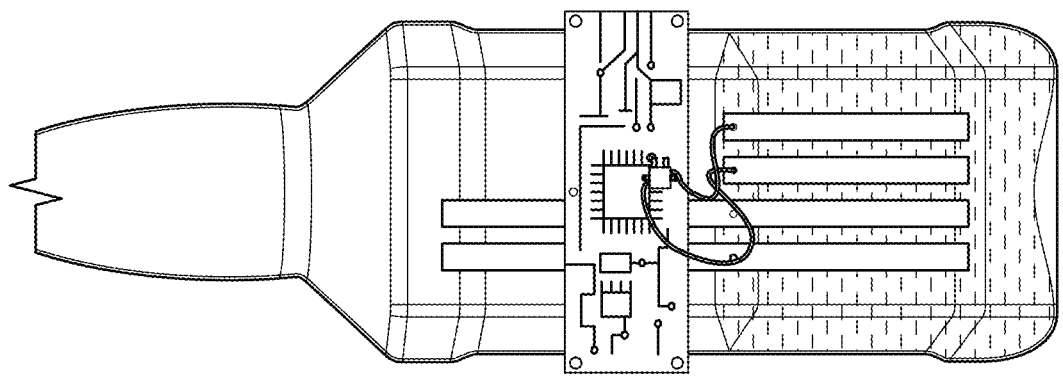
FIG. 2E illustrates other examples of the RFID capacitance liquid measurement tag system shown in FIG. 1, according to one or more embodiments shown and described herein.
Figure 2D:
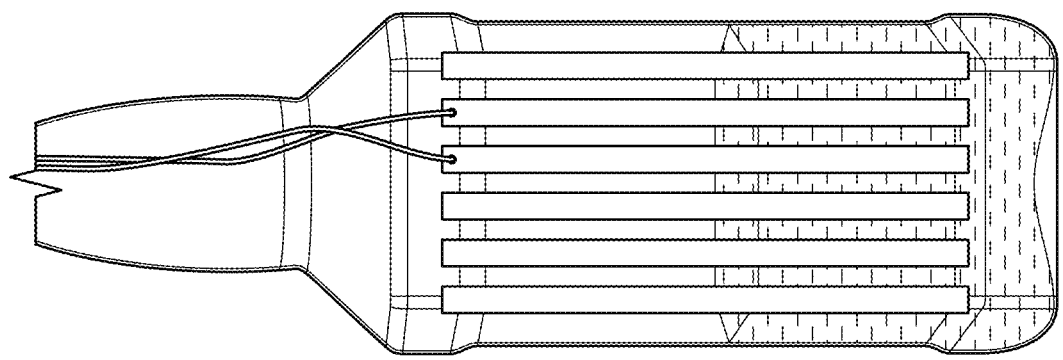
FIG. 2D illustrates other examples of the RFID capacitance liquid measurement tag system shown in FIG. 1, according to one or more embodiments shown and described herein.
Figure 2C:
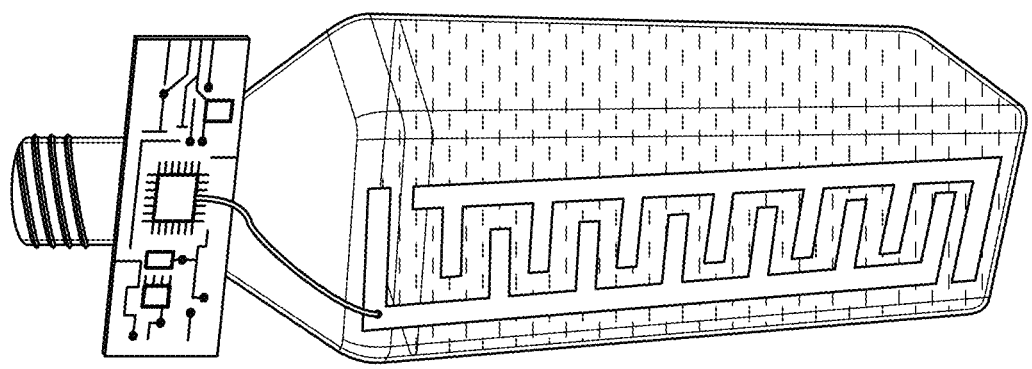
FIG. 2C illustrates other examples of the RFID capacitance liquid measurement tag system shown in FIG. 1, according to one or more embodiments shown and described herein.
Figure 2B:
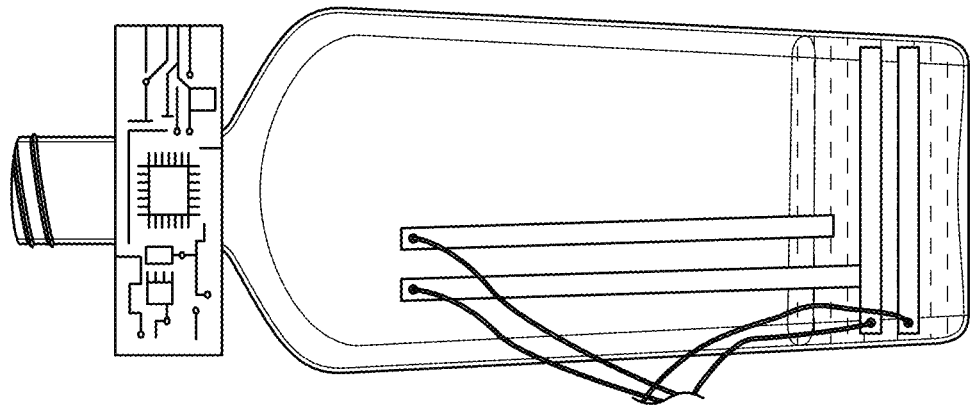
FIG. 2B illustrates other examples of the RFID capacitance liquid measurement tag system shown in FIG. 1, according to one or more embodiments shown and described herein.

FIG. 2A illustrates another of the RCLMT system 100 shown in FIG. 1. In detail, FIG. 2A depicts an example of how the system 100 configuration may appear in a real-world environment. FIGS. 2B-2E depict other examples of the RCLMT system 100, each having a different configuration for the sensor structure.

Figure 2F:
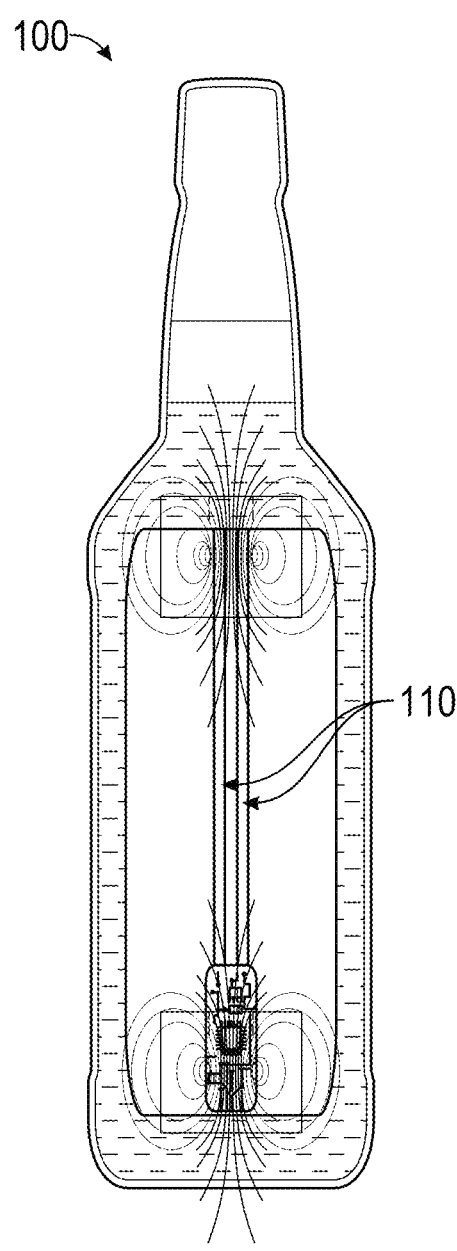
FIG. 2F illustrates other examples of the RFID capacitance liquid measurement tag system shown in FIG. 1, according to one or more embodiments shown and described herein.
Figure 2G:
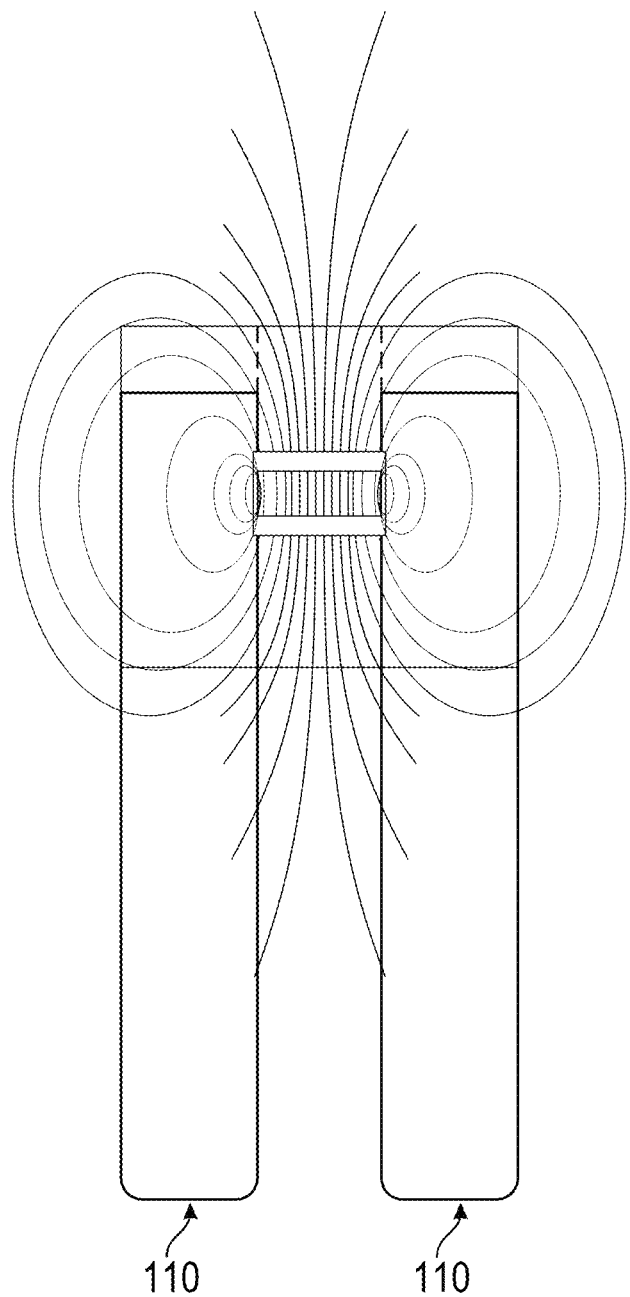
FIG. 2G illustrates other examples of the RFID capacitance liquid measurement tag system shown in FIG. 1, according to one or more embodiments shown and described herein.

FIG. 2F and FIG. 2G illustrate the capacitive strips 110 with shielding, as provided according to the embodiments.

As previously disclosed, the capacitive strips 110 are designed to read contents (e.g., liquid) in the bottle and limit its ability to read what is outward from the bottle as well as be manipulated by parasitic interference. One source of interference in capacitive sensing is parasitic capacitance to ground along the signal path between the RFID component and the parallel electrode sensor (copper strip). This interfering capacitance can be represented by any part of the circuit, or a physical object, that causes an unintended alteration in the electric field (like a hand touching the bottle). Given the tricky nature and physics principles of RFID technology, the tags of the RCLMT system have to be designed in such a way that prevents unwanted interference (e.g., noise) produced by the RF field from being picked up by the capacitive strips 110. The capacitance strip 110 acts as the component for measuring the liquid in a given container. Consequently, the capacitance strip sensor can also act as an unwanted antenna that picks up RF noise given the fact that it is a sizable metallic object in the immediate vicinity of the onboard RFID antenna structure of a tag, and the capacitive strips 110 are being subjected to radio waves that can produce undesirable results and less accurate measurements. For this reason, shielding is included in the design of the tags from an industrial design standpoint and material science standpoint. This differentiates RCLMT system from other capacitance liquid measurement systems or RFID tag utilized for liquid reading applications.

The disclosed RCLMT system acknowledges that the copper strips are protected from acting as an antenna. In this instance of using parallel plate capacitance principles for measuring the vertical height of a liquid in a container (which translates to a volume measurement based on the dimension specifications of each container), a "fringe/fringing" effect can occur. Fringe effect occurs when the electric field extends the area of the parallel plates, which ultimately adds a benefit to our invention as it applies to the use case. This principle actually allows for a more discrete tag design that does not need to extend the entire vertical length of a container's external surface. The tag design can extend the vertical length of most brand/informational labels that exist on containers in order to make the RCLMT system, as a whole, more aesthetically pleasing and less noticeable.

These design aspects are important because this very nature allows for the opportunity to be discrete and utilize the space within what appears to be the already existing brand label vs. having to provide a label or strip that creates a different aesthetic to the bottle all together. Consequently, there might be a way to accurately measure the liquid by only having a RCMLT that extends 70% or 80% the vertical length of the bottle.

Figure 3:
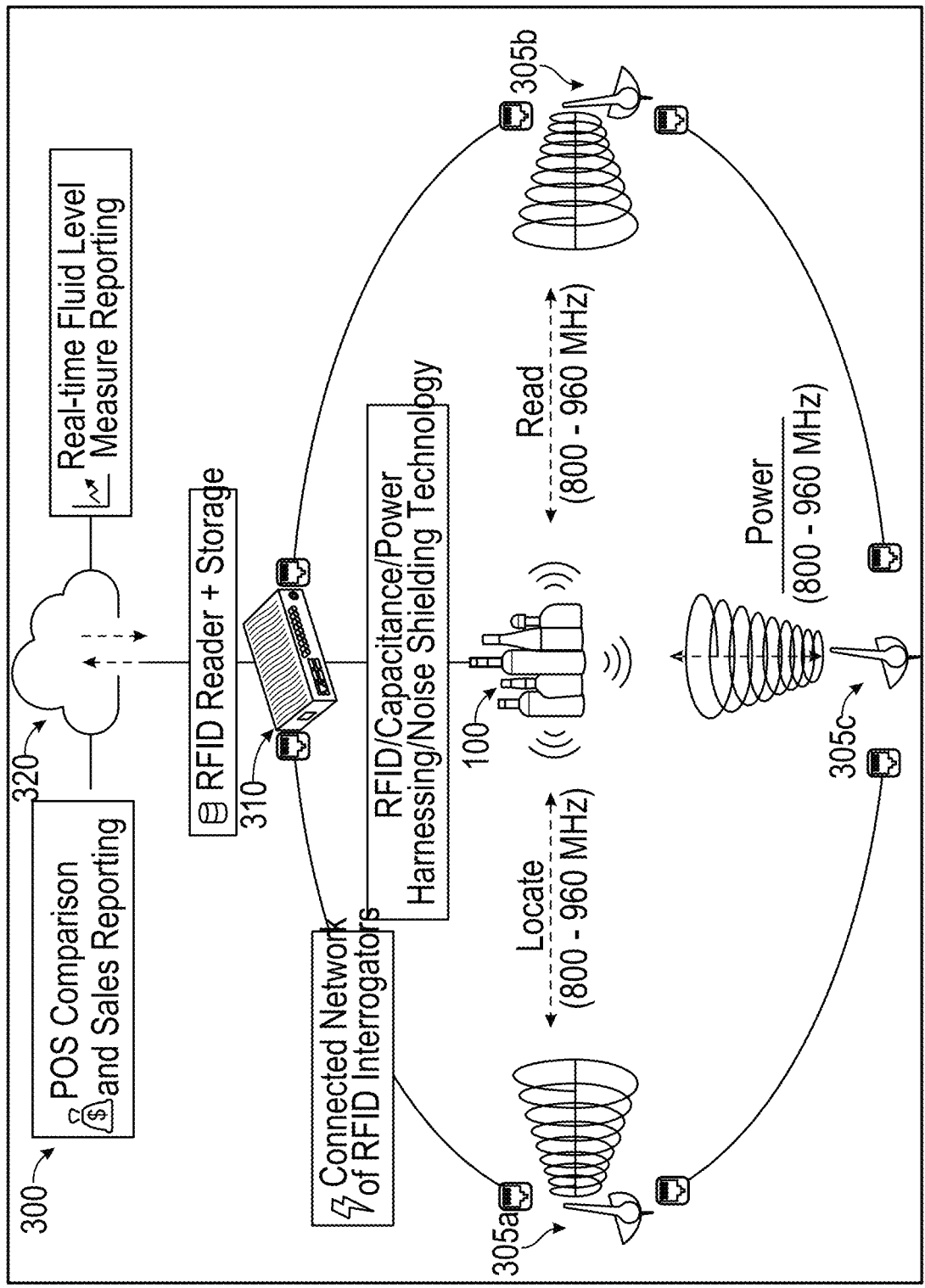
FIG. 3 depicts an example infrastructure integrating the RFID capacitance liquid measurement tag system shown in FIG. 1, according to one or more embodiments shown and described herein.

FIG. 3 depicts an example platform 300 that integrates the RCLMT system 100 shown in FIG. 1. In the illustrated example, the platform 300 is a hardware and software architecture that acts as the framework upon which other higher-level applications, processes, are implemented. In FIG. 3, the platform 300 includes multiple RCLMT systems 100 that can be attached to the multiple liquid containers, thus acting as an RFID tag and sensor to detect the liquid level for the liquid beverage within the respective container. For example, a single RCLMT system 100 can be individually applied to an individual bottle of alcohol/wine, until each bottle in the inventory has a corresponding RCLMT systems 100 attached thereon. The platform 300 also includes RFID antennas 305a, 305b, 305c and an RFID reader 310 situated within an area nearby the RCLMT systems 100. The RFID antennas 305a, 305b, 305c can be implemented as a connected network of RFID interrogators.

This proximity, where the RFID antennas 305a, 305b, 305c and the RFID reader 310 are within an RF range for the RCLMT system 100, allows a wireless interaction between the RFID antennas 305a, 305b, 305c, RFID reader 310 and RCLMT systems 100. The wireless RF communication can operate at various frequencies for the RF signals that are enabled within a certain RF field (e.g., 800-960 MHz, including but not limited frequencies below and above this range). For instance, the RFID antennas 305a, 305b, 305c, can communicate wirelessly (via wireless RF technology) with the RFID tags of the RCLMT systems 100 in manner that allows each RFID tag to be located, powered, and read. RFID antennas 305a, 305b, 305c can utilize specific frequency like 125-134 MHz as low frequency, 13.56 MHz as a high frequency and 856 MHz to 960 MHz as ultra-high frequency to interrogate the RFID tags of the RCLMT systems 100.

Generally, the RF wireless communication between the RFID antennas 305a, 305b, 305c, RFID reader 310 and RCLMT systems 100 on the platform 300 utilizes radio waves to perform Automatic Identification and Data Capture (AIDC) function. The RFID antennas 305a, 305b, 305c are devices which converts power into radio waves which are used for wireless communication between RFID reader 310 and the RFID tags of the multiple RCLMT systems 100. In this example, the RFID tags of the RCLMT systems 100 are implemented as passive RFID tags, and thus are not attached by a power supply. When one of the RCLMT systems 100 is within the RF range of one of the RFID antennas 305a, 305b, 305c, radio waves (e.g., RF energy) are emitted from the corresponding one of the active antennas 305a, 305b, 305c. This energy associated with the transmitted radio waves provides power to activate the RFID tags of the multiple RCLMT systems 100. For example, an antenna inside the RFID tag for each of the multiple RCLMT systems 100 receives radio waves from the RFID antennas 305a, 305b, 305c. Thus, in response to having power supplied by the antennas 305a, 305b, 305c, (via the transmitted radio waves) each RCLMT systems 100 can execute RF-based wireless communication that effectively detects (e.g., identifies, locates) and reads data from the multiple RCLMT systems 100. For instance, the radio waves transmitted by the RFID antennas 305a, 305b, 305c interrogate and/or are received by RFID tags in a manner that locates the multiple RFID capacitance liquid measurement and tag systems 100.

Stated another way, the RFID antennas 305a, 305b, 305c use radio waves to transmit RF signals that activate the tags of the RCLMT systems 100. Once activated, electric current flows through the corresponding RFID tag of the RCLMT systems 100, which converts the data (in the RFID chip) into RF signals. Then, the antenna RFID antennas 305a, 305b, 305c receive RF signals returned from the RFID tags of the multiple RCLMT systems 100. The RFID tags of the multiple RCLMT systems 100 send radio waves back to the RFID antennas 305a, 305b, 305c, where it is translated into data. Data that is read from the RCLMT systems 100 can then be processed via other elements of the platform 300, such as computers implementing services (e.g., applications) that are connected to the RFID reader 310 via a communication network (e.g., Internet).

Particularly, data read from the RCLMT systems 100 represents the liquid level of the containers that is measured by the capacitive sensing capabilities of the RCLMT system 100. Thus, the RFID reader 310 retrieves the information from RCLMT systems 100, which is digital data representing the volume of liquid that is currently within each of the containers that is sensed by its respective RCLMT systems

100. For example, data digitally encoded in an RFID tag of the RCLMT systems 100 might be read by the RFID reader 310.

Also, the platform 300 is shown to include services 320 that can utilize the liquid level detection information captured by the RFID reader 310 from the RCLMT systems 100 (operating as liquid level detection sensors) in order to provide further tracking and analysis.

The services 320 may be implemented with a backend system, for instance one or more remote servers, computer systems, or a user platform. For example, computer systems can execute applications related to detecting the volume of liquid that is currently held within the respective container, and accordingly process the data (representing the detected liquid volume and/or liquid level) that is generated by the multiple RFID capacitance liquid measurement and tag systems 100. In the example, the services 320 are a point of sale (POS) comparison and sales reporting service and a real-time fluid level measuring reporting service. For example, the platform 300 can interrogate each of the RCLMT systems 100 to obtain data representing the liquid level for each alcohol/wine bottle in the inventory and communicate this data to the services 320. As a result, the services 320 can provide real-time fluid level measuring reports and POS) comparison and sales reports to appropriate users, for instance bar managers, in a manner that allows to better track and assess the inventory and any product loss.

Figure 4:
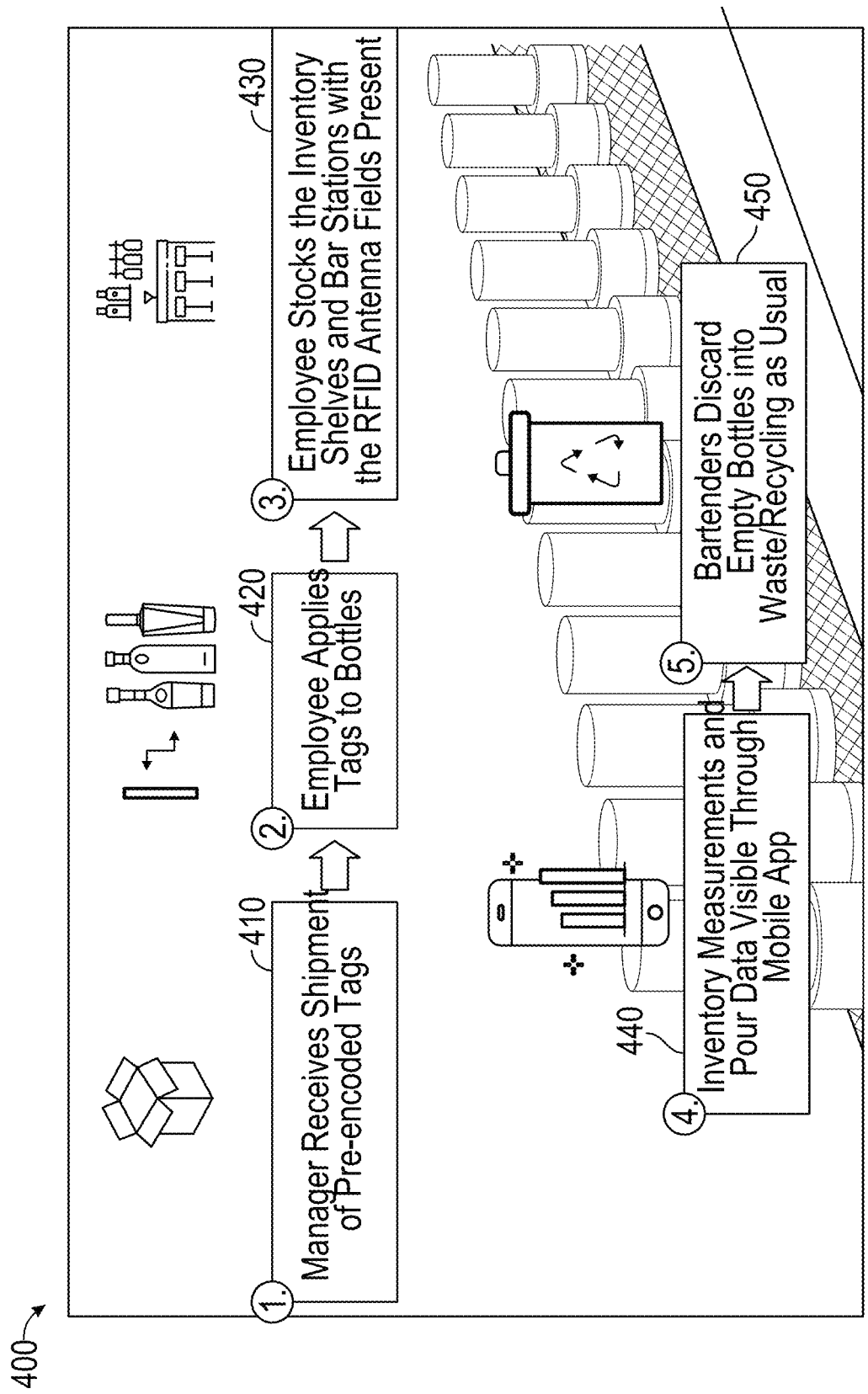
FIG. 4 depicts an example of a user flow for employing the RFID capacitance liquid measurement tag system shown in FIG. 1, according to one or more embodiments shown and described herein.

In reference to FIG. 4, an example user flow 400 for deploying and employing the RCLMT system is depicted. The flow 400 begins at operation 410, where a manager can receive a shipment of RFID tags, namely the RCLMT system (shown in FIG. 1).

Next, at operation 420, a user, such an inventor manager can apply the RFID tags to bottles, or containers. As previously described, each RCLMT system (including an RFID tag) can be attached (using an adhesive) to a respective container of liquid beverage, such as a bottle wine/alcohol.

The flow 400 can continue to operation 430, where another user, for instance a bar employee, stocks the bar with bottles having the RCLMT system (including an RFID tag). Subsequently, during operations of the bar, where the employee is dispensing the liquid beverages, the RCLMT systems can begin acting as liquid level detection sensors. Here, at operation 440, the inventory measurements and pour data can be collected from the RCLMT systems attached to the bottles of wine/alcohol. Further, a user platform can obtain this data in order to display these inventory measurements and pour data through a mobile application (app).

The flow 400 can then proceed to operation 450, where the employee (e.g., bartender) discards the empty bottles of wine/alcohol into a waste bin, as in usual operations. As a feature of the RCLMT systems, as disclosed here, the device is disposable which allows the system to be easily discarded with empty bottles (e.g., not required to be removed).

Figure 5:
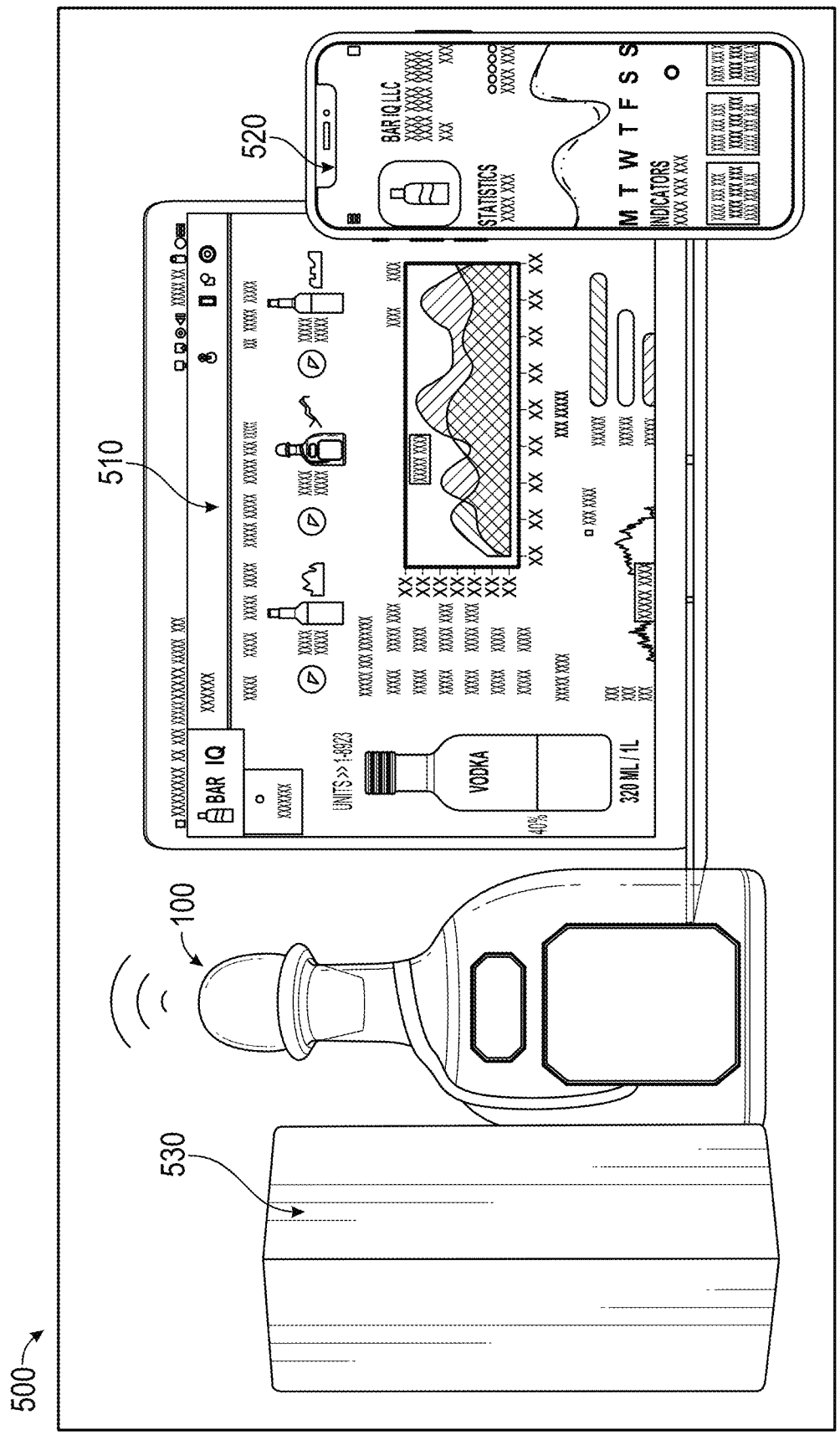
FIG. 5 depicts an example configuration for a user platform including the RFID capacitance liquid measurement tag system shown in FIG. 1, according to one or more embodiments shown and described herein.

Referring now to FIG. 5, depicts an example configuration for a user platform 500 including the RCLMT system 100 is shown. In an embodiment, the user platform 500 is implemented as a web-based platform that can be accessed remotely by a software application (app) installed on computer devices 510, 520 to implement the tracking, management, and analysis features supported to the liquid level detection capabilities of the RCLMT system 100. For example, the app of the user platform 500 can interactively display various inventory management and/or real-time pour data interfaces to a user, such as a bar manager, that is using the computer devices 510, 520.

The user platform 500 can be implemented as a responsive platform across all types of devices, such as desktop computer, laptop computer, tablet device, and smartphones, respectively. FIG. 5 depicts a laptop computer 510 and a smartphone 520, as examples of computer devices that can be employed with the platform 500. It should be appreciated that the computer devices 510, 520 may be implemented as various numbers of computing devices, such as a smartphone, a tablet, a laptop, a workstation, a local or remote server, or a wearable device such as a smartwatch. In the example, the computer devices 510, 520 may be wirelessly connected to the RFID reader 530. Thus, any liquid level detection data that is obtained by the RFID reader 530 (from the RCLMT 100 affixed to the bottle of alcohol shown) can be wireless communicated to the app executing on the computer devices 510, 520. Alternatively, the RFID reader 530 may communicate the liquid level detection data to a remote processing system, such as a backend server. In this case, the app executing on the computer devices 510, 520 may communicate with the backend via a wide area network (WAN), such as the Internet, in order to obtain the data needed to interactively display the various inventory management and/or real-time pour data interfaces to a user on the computer devices 510, 520. As seen in FIG. 5, the app can display data on the computer devices 510, 520 in a manner that can be easily interpreted and/or understood by a user, for instance generating graphs, charts, visual representations (e.g., icon representing a particular bottle of wine/alcohol), and digital data.

Figure 6:
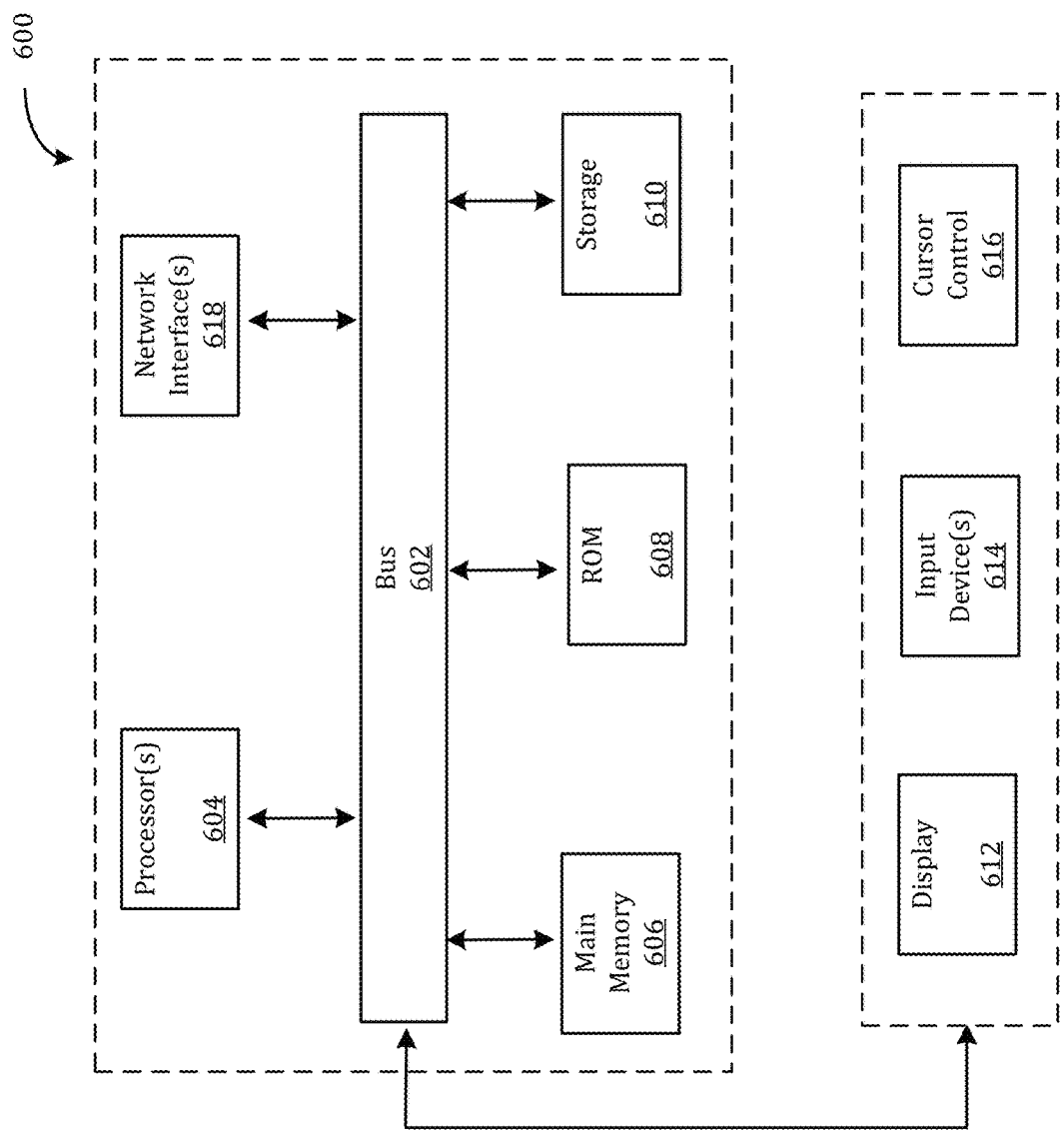
FIG. 6 depicts an example of a computer system that may be used in implementing the user platform shown in FIG. 5, according to one or more embodiments shown and described herein.
Figure 7:
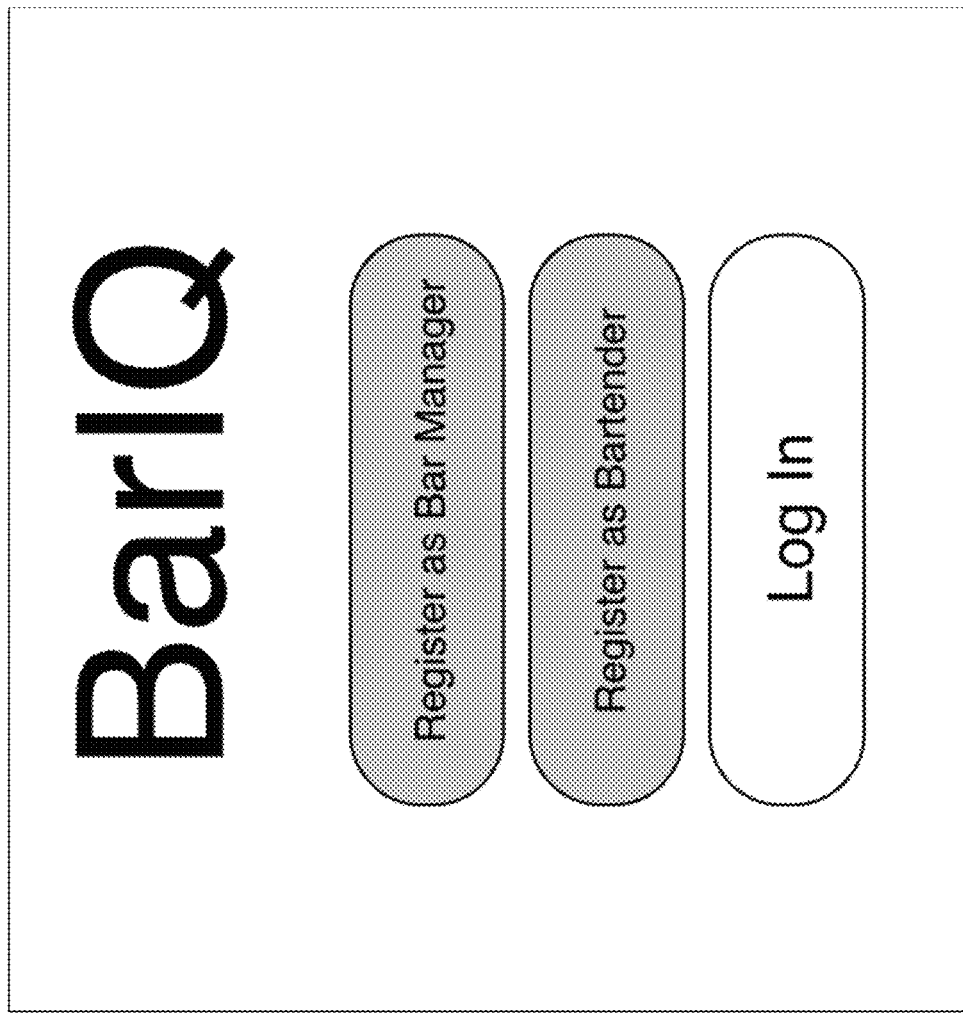
FIG. 7 illustrates an example graphical user interface displaying Point of Sale (POS) data that can be implemented by user platform shown in FIG. 5, according to one or more embodiments shown and described herein.

Accordingly, the computer devices 510, 520 can utilize the software applications of the user platform 500 to implement graphical user interfaces (GUI) and user experience (UX) environments to allow a user to access, view, and interact with real-time content relating to liquid level measurements as it is streamed over a distributed communication network (e.g., Internet) and made locally available (e.g., local networks or individual computers and devices). Examples of GUIs that may be implemented by the apps running of computer devices 510, 520 are depicted in FIG. 6-FIG. 7. Furthermore, FIG. 9-FIG. 26 illustrate additional examples of GUIs for implementing various features of the user platform 500 and the RCLMT system. It should be understood that the GUIs illustrated are merely exemplary and are not intended to be limiting. Accordingly, the app of the platform 500, as disclosed herein, can support other GUIs and/or features that are not illustrated in FIG. 6-FIG. 7, and FIG. 9-FIG. 26.

FIG. 6 depicts a block diagram of an example computer system 600 in which the software application aspects of the user platform (including the RCLMT system) may be implemented. Furthermore, it should be appreciated that although the various instructions are illustrated as being co-located within a single processing unit, there may be some implementations in which processor(s) includes multiple processing units, allowing one or more instructions may be executed remotely from the other instructions.

The computer system 600 includes a bus 602 or other communication mechanism for communicating information, one or more hardware processors 604 coupled with bus 612 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Python, Ruby on Rails or NodeJS. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local networks and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device but may not include the second device receiving the data. Conversely, "receiving" from a first device may include receiving the data from a network but may not include the first device transmitting the data.

FIG. 7 illustrates an example graphical user interface displaying Point of Sale (POS) data that can be implemented by user platform shown in FIG. 5, according to one or more embodiments shown and described herein. FIG. 7, 700 shows a log in GUI where a user can register as a bar manager, register as a bartender, or log in.

FIG. 8 illustrates an example graphical user interface displaying real-time pour data that can be implemented by user platform shown in FIG. 5, according to one or more embodiments shown and described herein. FIG. 8, 800 shows a log in GUI where stickers IDs can be applied to inventory. FIG. 8, 800 allows you to set and manage sticker IDs, drink names, drink types, and prices for the bar inventory.

Figure 9:
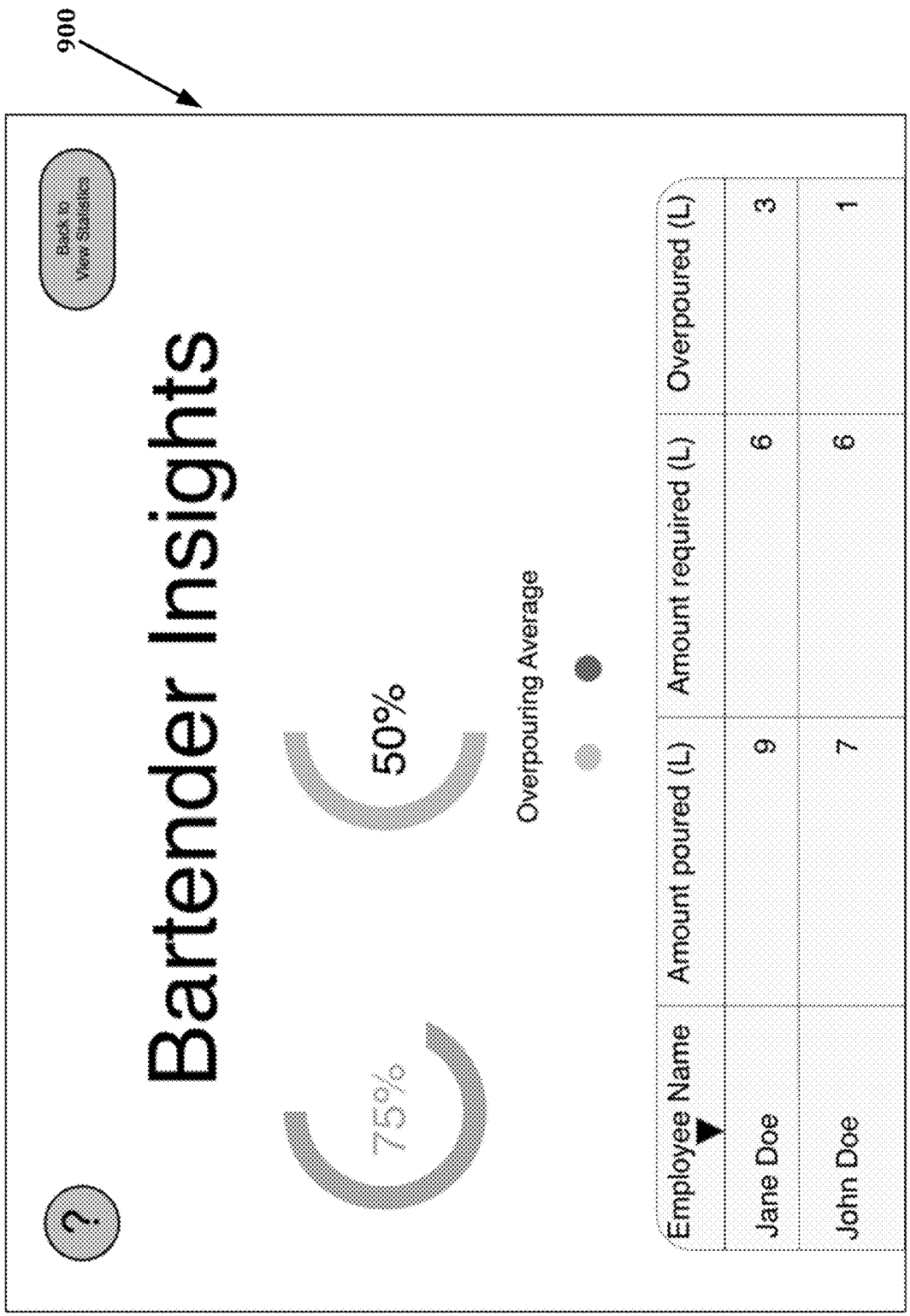
FIG. 9 illustrates examples of graphical user interfaces displaying various features that may be implemented by the user platform including the RFID capacitance liquid measurement tag system shown in FIG. 1, according to one or more embodiments shown and described herein.

FIG. 9 illustrates examples of graphical user interfaces displaying various features that may be implemented by the user platform including the RFID capacitance liquid measurement tag system shown in FIG. 1, according to one or more embodiments shown and described herein. FIG. 9, 900 shows a log in GUI where each employee's bartending performance is tracked by tracking the employee name, amount poured, amount required, amount over poured, and calculated overpouring amount and/or average for the bar.

Figure 10:
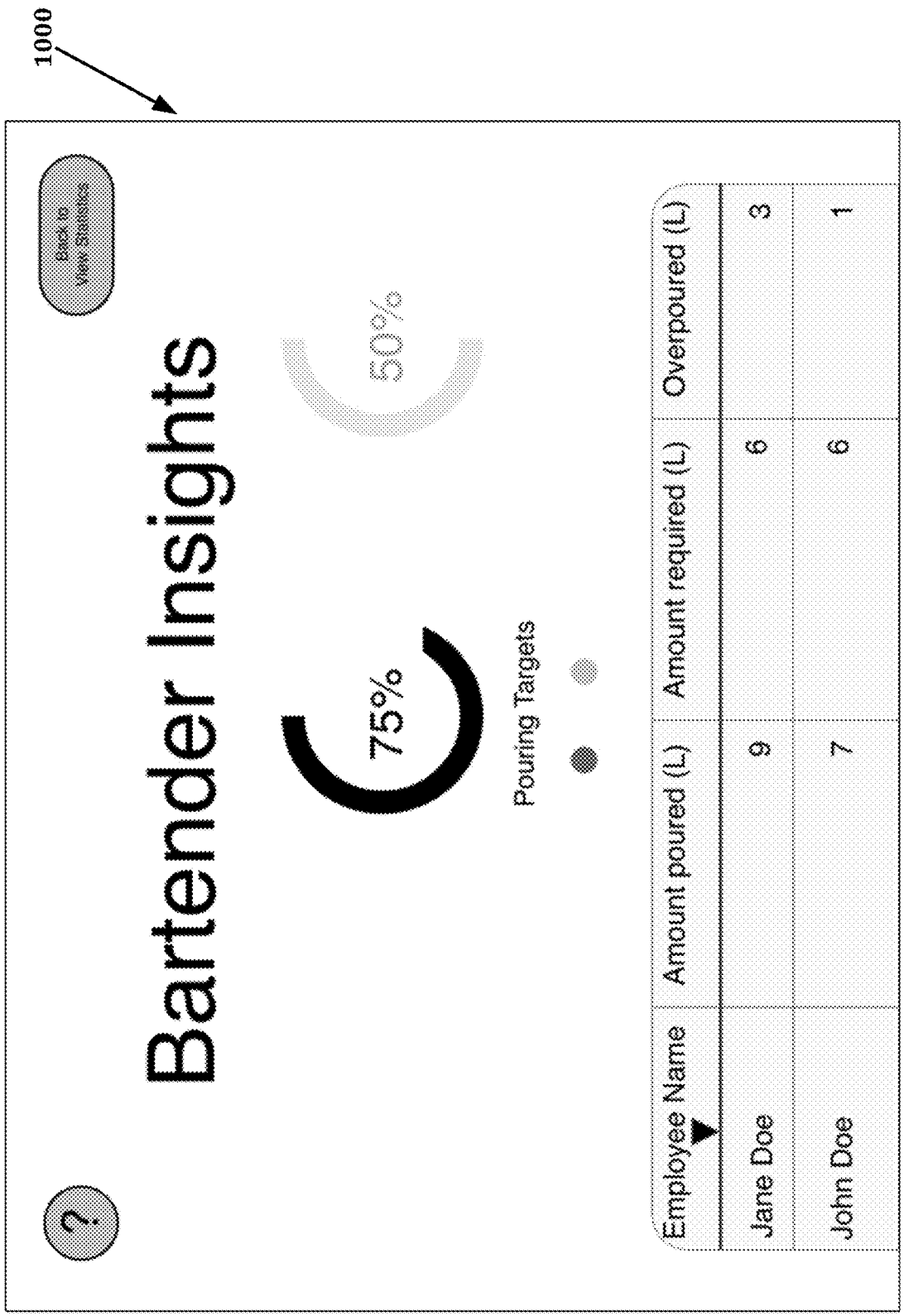
FIG. 10 illustrates examples of graphical user interfaces displaying various features that may be implemented by the user platform including the RFID capacitance liquid measurement tag system shown in FIG. 1, according to one or more embodiments shown and described herein.

FIG. 10 illustrates examples of graphical user interfaces displaying various features that may be implemented by the user platform including the RFID capacitance liquid measurement tag system shown in FIG. 1, according to one or more embodiments shown and described herein. FIG. 10, 1000 shows a log in GUI where each employee's bartending performance is tracked by tracking the employee name, amount poured, amount required, amount over poured, and calculated pouring targets actual amount and/or average for the bar.

FIG. 11 illustrates examples of graphical user interfaces displaying various features that may be implemented by the user platform including the RFID capacitance liquid measurement tag system shown in FIG. 1, according to one or more embodiments shown and described herein. FIG. 11, 1100 shows a log in GUI where each employee's bartending performance is tracked by tracking the employee name, amount poured, amount required, amount over poured, and filters for shift times. The spreadsheet GUI also allows for sorting by employee name in ascending and descending order.

FIG. 12 illustrates examples of graphical user interfaces displaying various features that may be implemented by the user platform including the RFID capacitance liquid measurement tag system shown in FIG. 1, according to one or more embodiments shown and described herein. FIG. 12, 1200 shows a log in GUI where each employee's bartending performance is tracked by tracking the employee name, amount poured, amount required, amount over poured, and filters for shift times. The spreadsheet GUI also allows for sorting by employee name in ascending and descending order.

Figure 13:
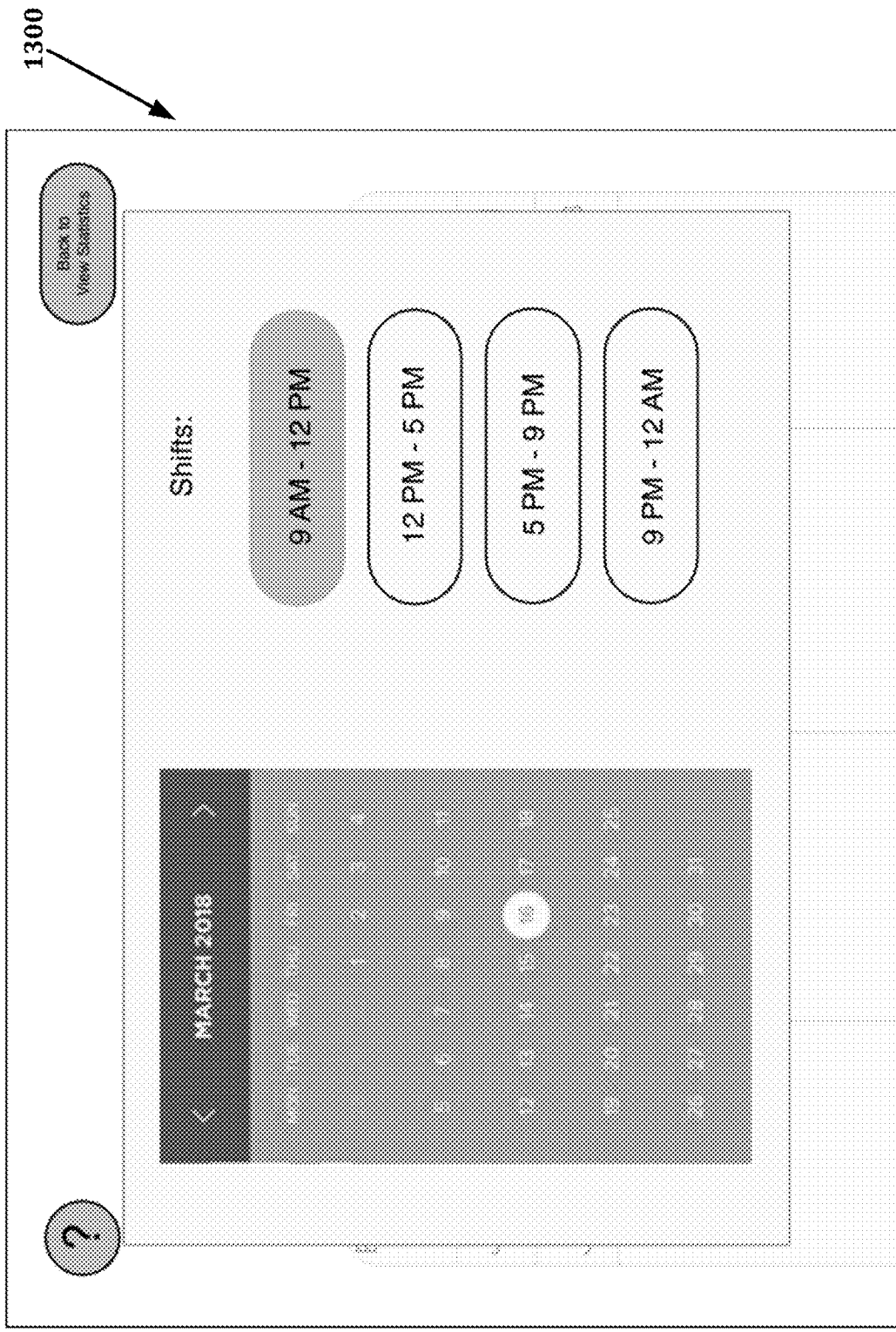
FIG. 13 illustrates examples of graphical user interfaces displaying various features that may be implemented by the user platform including the RFID capacitance liquid measurement tag system shown in FIG. 1, according to one or more embodiments shown and described herein.

FIG. 13 illustrates examples of graphical user interfaces displaying various features that may be implemented by the user platform including the RFID capacitance liquid measurement tag system shown in FIG. 1, according to one or more embodiments shown and described herein. FIG. 13, 1300 shows a log in GUI where the spreadsheet GUI allows for a bar manager to set working shifts. The spreadsheet also allows an employee to select a shift.

Figure 14:
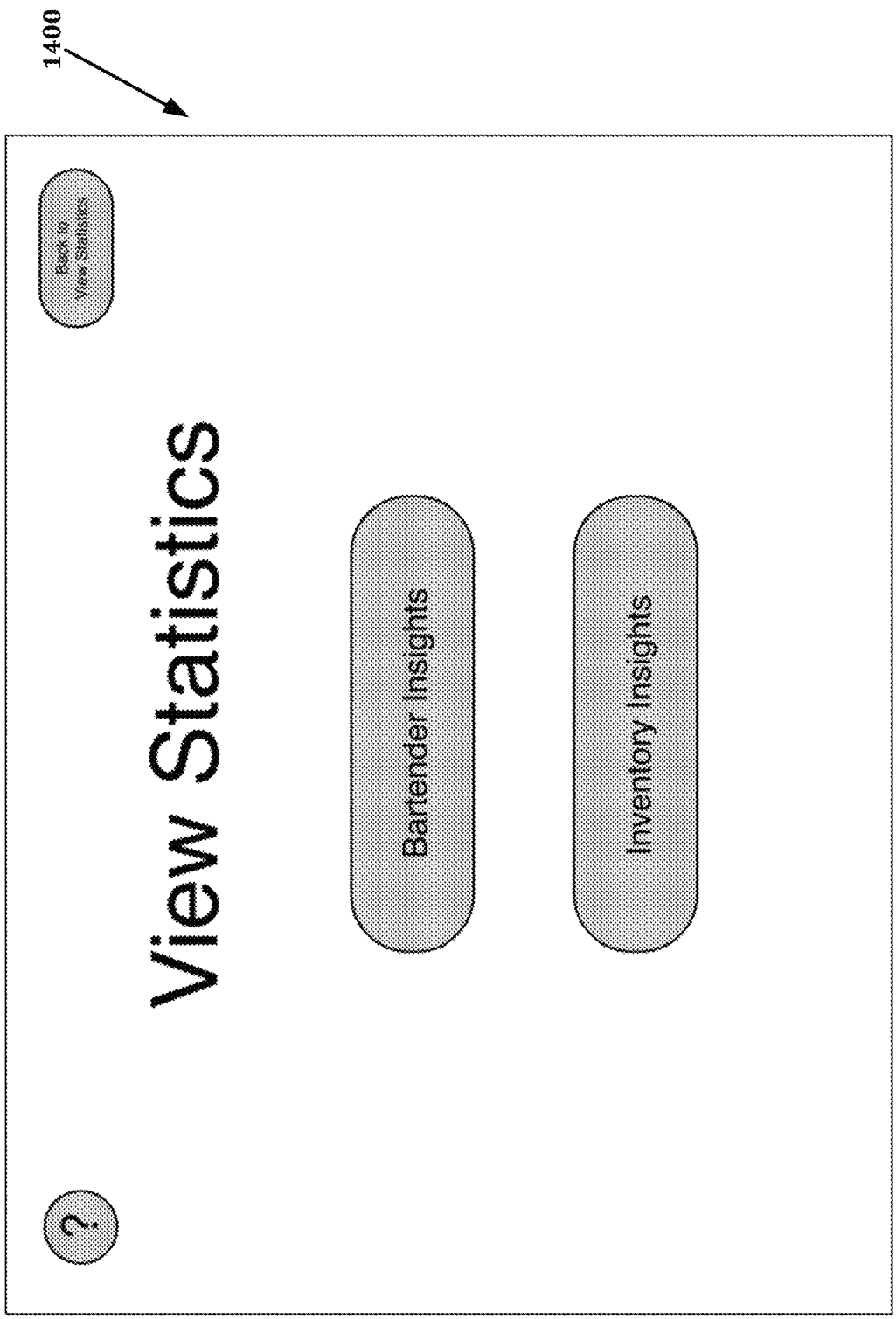
FIG. 14 illustrates examples of graphical user interfaces displaying various features that may be implemented by the user platform including the RFID capacitance liquid measurement tag system shown in FIG. 1, according to one or more embodiments shown and described herein.

FIG. 14 illustrates examples of graphical user interfaces displaying various features that may be implemented by the user platform including the RFID capacitance liquid measurement tag system shown in FIG. 1, according to one or more embodiments shown and described herein. FIG. 14, 1400 shows a GUI with a selection to view statistics from a selection between bartender insights and inventory insights. In one or more embodiments, there are more than these options to view other data collected from the sensors of the RFID CLMT system.

Figure 15:
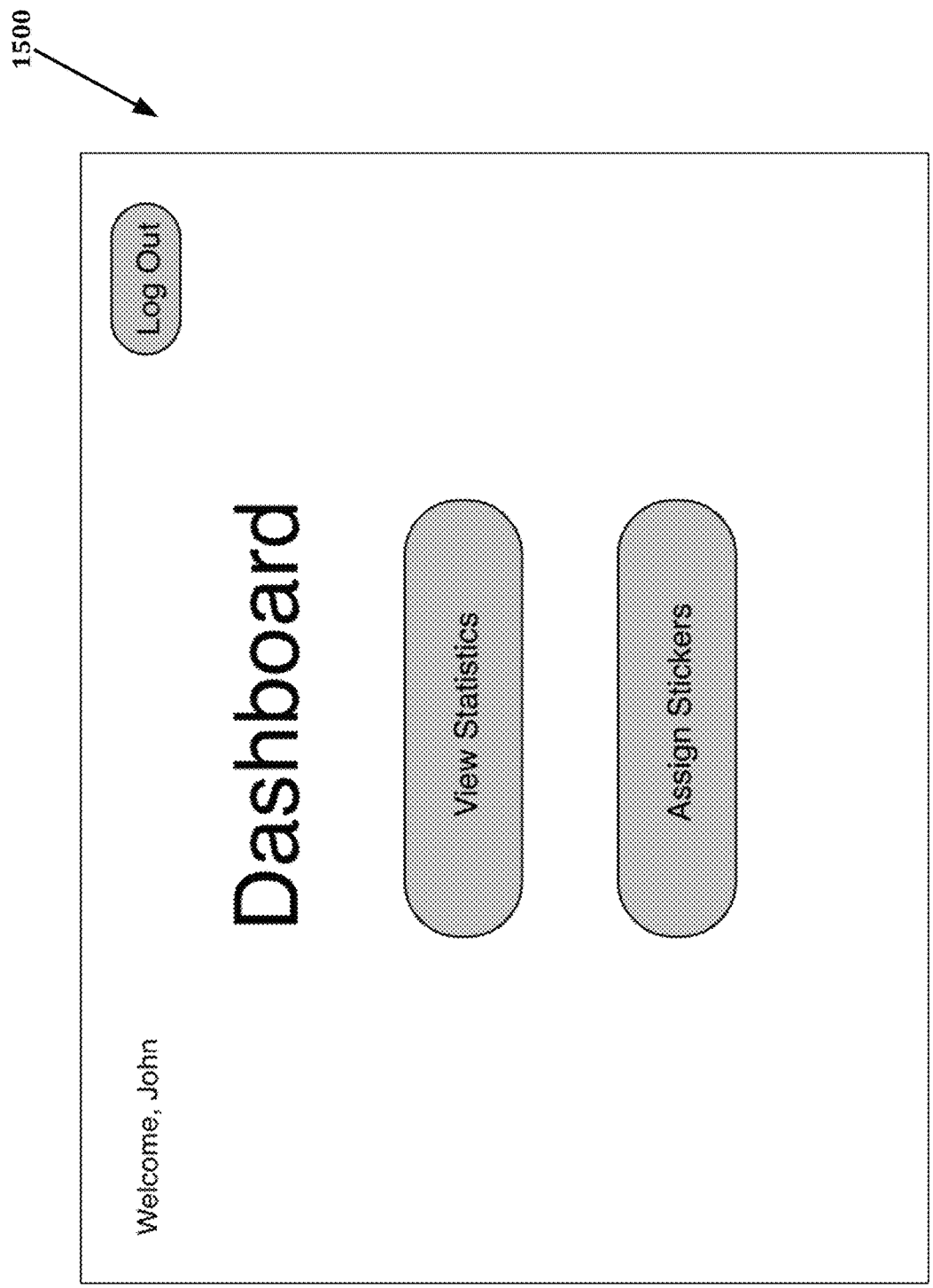
FIG. 15 illustrates examples of graphical user interfaces displaying various features that may be implemented by the user platform including the RFID capacitance liquid measurement tag system shown in FIG. 1, according to one or more embodiments shown and described herein.

FIG. 15 illustrates examples of graphical user interfaces displaying various features that may be implemented by the user platform including the RFID capacitance liquid measurement tag system shown in FIG. 1, according to one or more embodiments shown and described herein. FIG. 15, 1500 shows a GUI with a dashboard selection to view statistics, assign stickers, or log out. In one or more embodiments, there are more than these options to view other data collected from the sensors of the RFID CLMT system.

Figure 16:
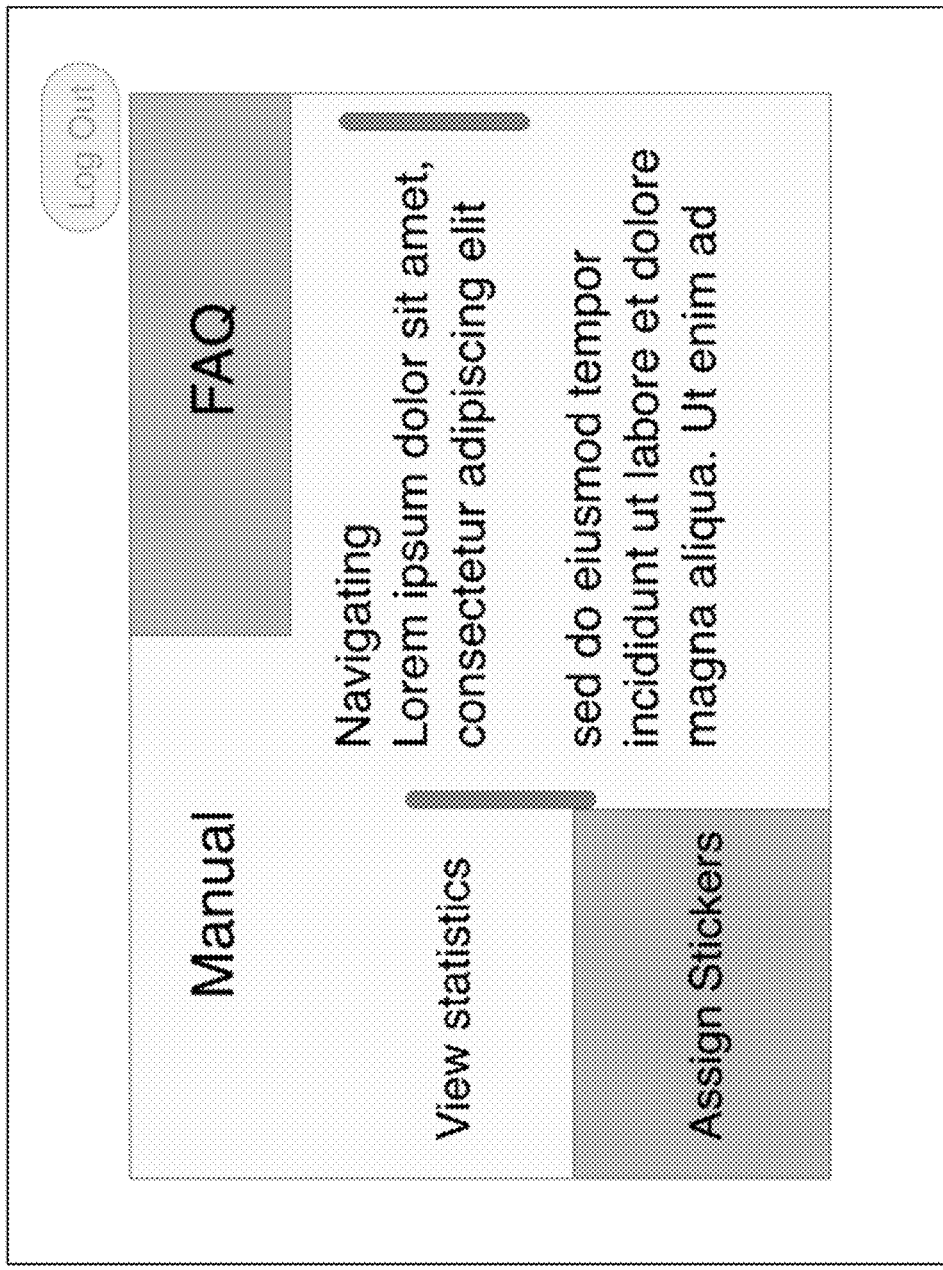
FIG. 16 illustrates examples of graphical user interfaces displaying various features that may be implemented by the user platform including the RFID capacitance liquid measurement tag system shown in FIG. 1, according to one or more embodiments shown and described herein.

FIG. 16 illustrates examples of graphical user interfaces displaying various features that may be implemented by the user platform including the RFID capacitance liquid measurement tag system shown in FIG. 1, according to one or more embodiments shown and described herein. FIG. 16, 1600 shows a GUI with a dashboard selection to view statistics, assign stickers, including additional selections of manual and FAQ selections. In one or more embodiments, there are more than these options to view other data collected from the sensors of the RFID CLMT system.

Figure 17:
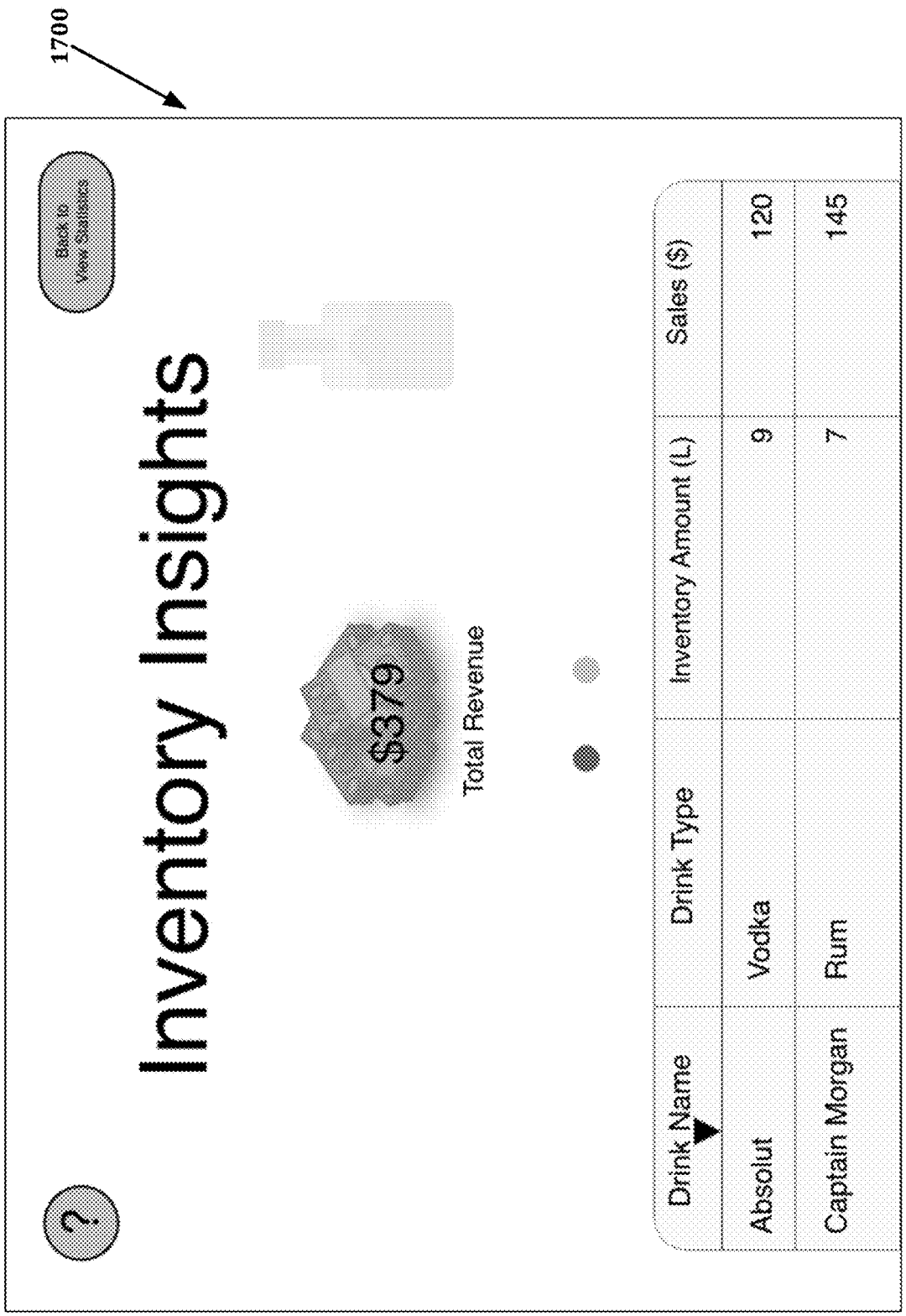
FIG. 17 illustrates examples of graphical user interfaces displaying various features that may be implemented by the user platform including the RFID capacitance liquid measurement tag system shown in FIG. 1, according to one or more embodiments shown and described herein.

FIG. 17 illustrates examples of graphical user interfaces displaying various features that may be implemented by the user platform including the RFID capacitance liquid measurement tag system shown in FIG. 1, according to one or more embodiments shown and described herein. FIG. 17, 1700 shows a GUI with a dashboard selection to view inventory insights showing total revenue, drink names, drink types, inventory amounts, and sales. In one or more embodiments, there are more than these options to view other data collected from the sensors of the RFID CLMT system.

Figure 18:
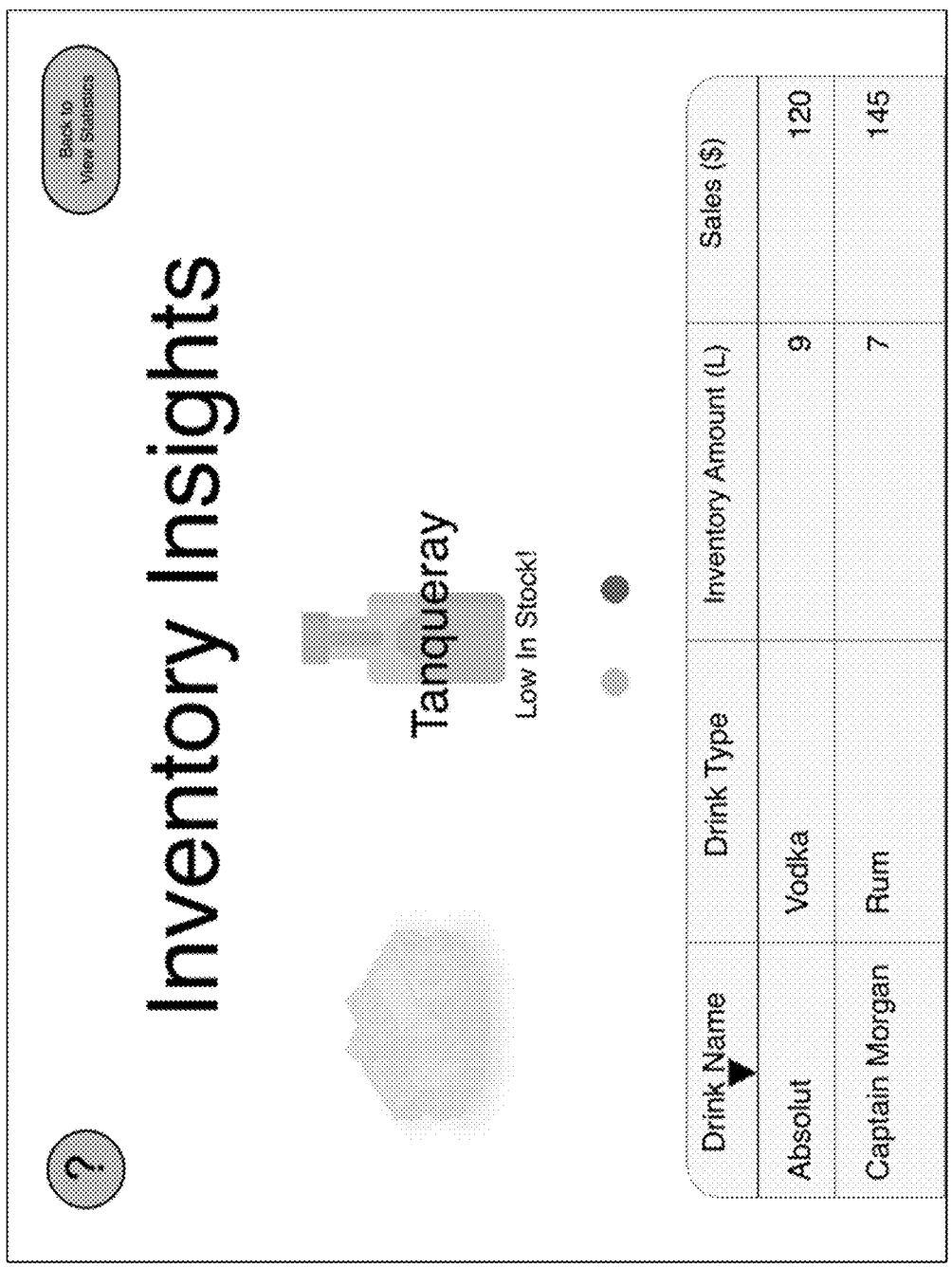
FIG. 18 illustrates examples of graphical user interfaces displaying various features that may be implemented by the user platform including the RFID capacitance liquid measurement tag system shown in FIG. 1, according to one or more embodiments shown and described herein.

FIG. 18 illustrates examples of graphical user interfaces displaying various features that may be implemented by the user platform including the RFID capacitance liquid measurement tag system shown in FIG. 1, according to one or more embodiments shown and described herein. FIG. 18, 1800 shows a GUI with a dashboard selection to view inventory insights showing total revenue, drink names, drink types, inventory amounts, and sales. In one or more embodiments, there are more than these options to view other data collected from the sensors of the RFID CLMT system.

FIG. 19 illustrates examples of graphical user interfaces displaying various features that may be implemented by the user platform including the RFID capacitance liquid measurement tag system shown in FIG. 1, according to one or more embodiments shown and described herein. FIG. 19, 1900 shows a GUI with a dashboard selection to view inventory insights showing total revenue, drink names, drink types, inventory amounts, and sales with an additional option of selecting a filter to further sort data. Filters include size of inventory or size of bottle. In one or more embodiments, there are more than these options to view other data collected from the sensors of the RFID CLMT system.

Figure 20:
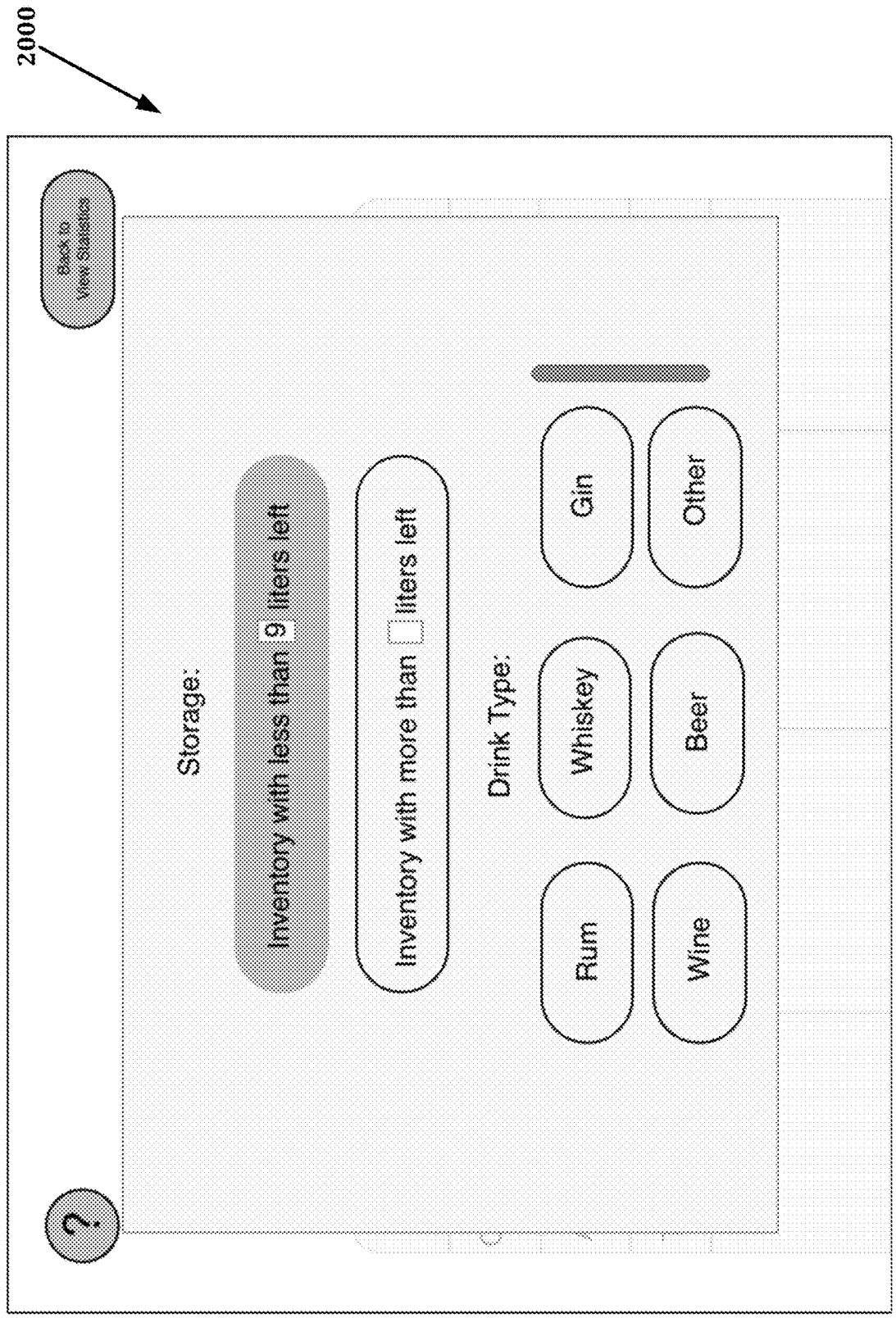
FIG. 20 illustrates examples of graphical user interfaces displaying various features that may be implemented by the user platform including the RFID capacitance liquid measurement tag system shown in FIG. 1, according to one or more embodiments shown and described herein.

FIG. 20 illustrates examples of graphical user interfaces displaying various features that may be implemented by the user platform including the RFID capacitance liquid measurement tag system shown in FIG. 1, according to one or more embodiments shown and described herein. FIG. 20, 2000 shows a GUI with a storage of inventory which allows a certain volume of inventory to be entered for sorting the inventory. The GUI also allows a user to enter a help button indicated by a question mark or toggle back to the previous menu of "view statistics." In one or more embodiments, there are more than these options to view other data collected from the sensors of the RFID CLMT system.

Figure 21:
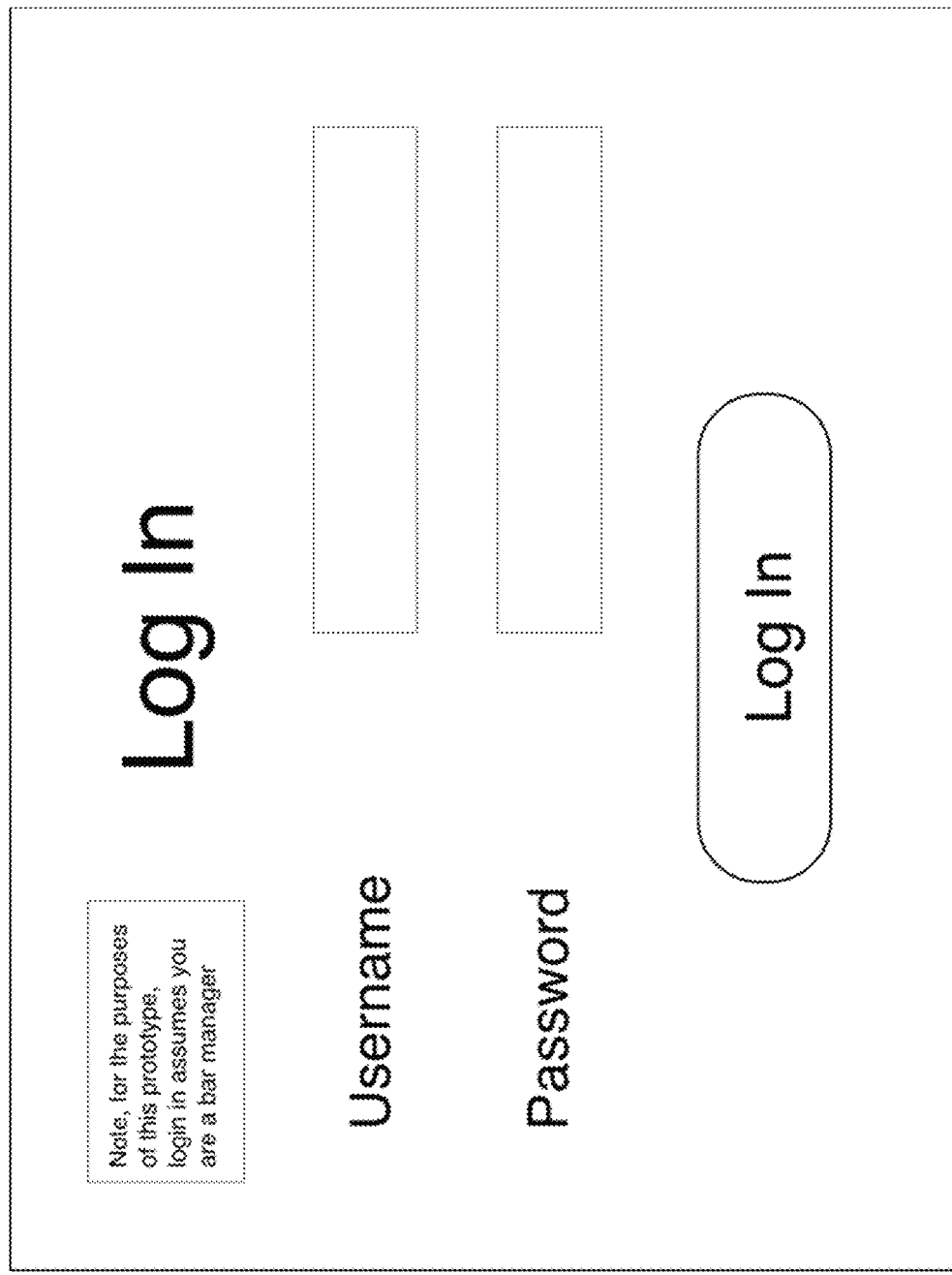
FIG. 21 illustrates examples of graphical user interfaces displaying various features that may be implemented by the user platform including the RFID capacitance liquid measurement tag system shown in FIG. 1, according to one or more embodiments shown and described herein.

FIG. 21 illustrates examples of graphical user interfaces displaying various features that may be implemented by the user platform including the RFID capacitance liquid measurement tag system shown in FIG. 1, according to one or more embodiments shown and described herein. FIG. 21, 2100 shows a log in GUI where a user can log in via entering a username or password.

FIG. 22 illustrates examples of graphical user interfaces displaying various features that may be implemented by the user platform including the RFID capacitance liquid measurement tag system shown in FIG. 1, according to one or more embodiments shown and described herein. FIG. 22, 2200 shows a GUI with a spreadsheet to view inventory details including but not limited to: date/time, brand/type/shot, bar station, amount poured, status, and the like. In one or more embodiments, there are more than these options to view other data collected from the sensors of the RFID CLMT system.

Figure 23:
FIG. 23 illustrates examples of graphical user interfaces displaying various features that may be implemented by the user platform including the RFID capacitance liquid measurement tag system shown in FIG. 1, according to one or more embodiments shown and described herein.

FIG. 23 illustrates examples of graphical user interfaces displaying various features that may be implemented by the user platform including the RFID capacitance liquid measurement tag system shown in FIG. 1, according to one or more embodiments shown and described herein. FIG. 23, 2300 shows a log in GUI where a user can register as a bar manager by creating a username, creating a password, confirming the password, entering an access ID, and clicking a register button.

Figure 24:
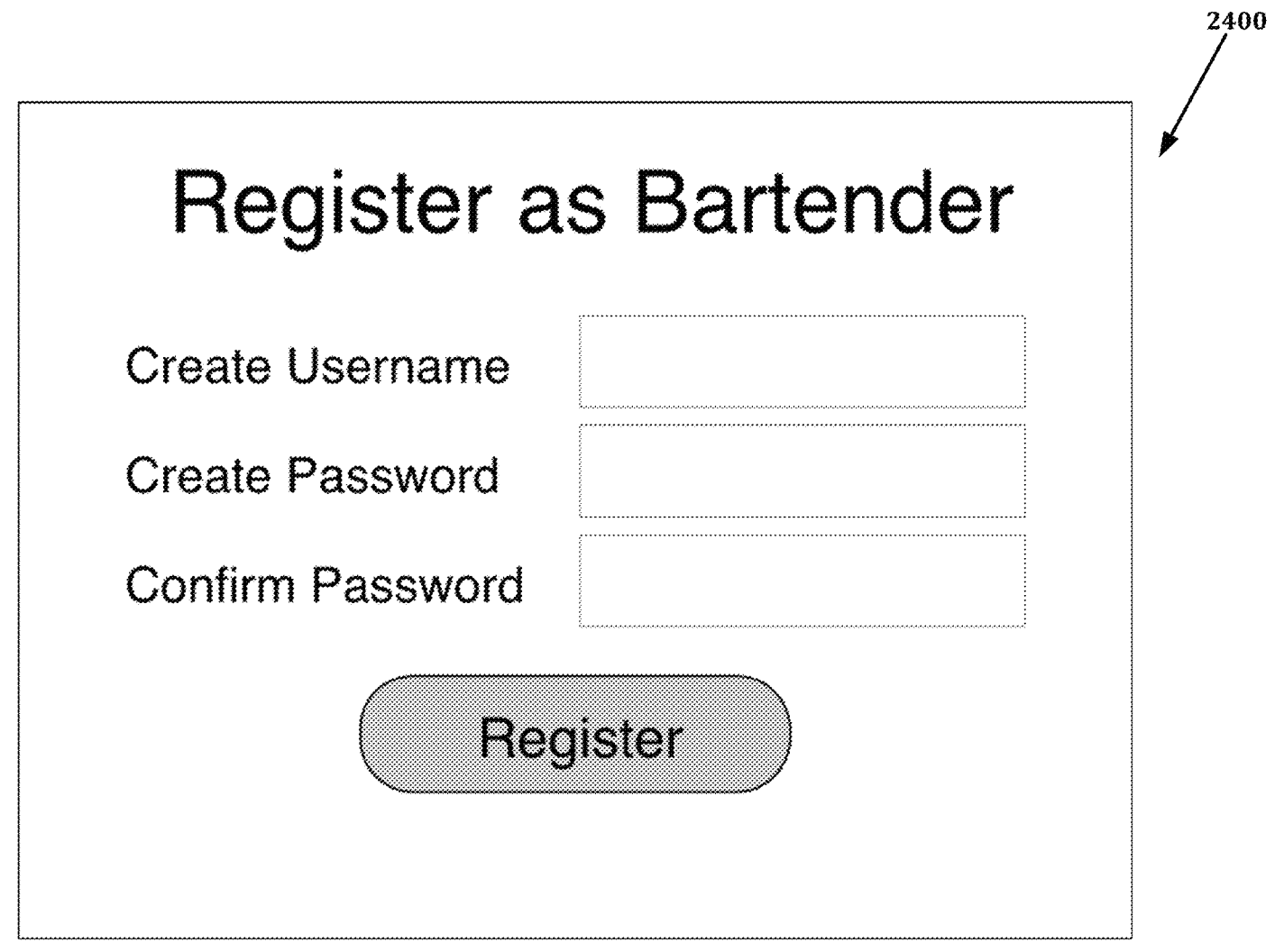

FIG. 24 illustrates examples of graphical user interfaces displaying various features that may be implemented by the user platform including the RFID capacitance liquid measurement tag system shown in FIG. 1, according to one or more embodiments shown and described herein. FIG. 24, 2400 shows a log in GUI where a user can register as a bartender by creating a username, creating a password, confirming the password, and clicking a register button.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system, comprising:
   capacitive strips affixed to an external surface of a container holding a liquid, wherein the capacitive strips are activated as a sensor sensing a volume of the liquid currently held within the container; and
   a radio-frequency identification (RFID) tag coupled to the capacitive strips and affixed to the external surface of the container, wherein the RFID tag transmits digital data corresponding to the volume of the liquid sensed by the capacitive strips.

2. The system of claim 1, wherein the capacitive strips sense a change in a capacitance of an electric field that corresponds to the volume of liquid currently held within the container in order to sense the volume of the liquid through the external surface of the container.

3. The system of claim 2, wherein the RFID tag is activated by radio-frequency (RF) energy and sends current through the capacitive strips to generate the electric field which activates the capacitive strips as the sensor.

4. The system of claim 3, wherein the RF energy to activate the RFID tag is emitted by an RFID antenna within an RF range.

5. The system of claim 3, wherein the RFID tag comprises an RFID integrated circuit and a flexible printed circuit board (PCB).

6. The system of claim 5, wherein the flexible PCB comprises an analog-to-digital (ADC) converter.

7. The system of claim 6, wherein the ADC converts the sensed change in the capacitance of the electric field to the digital data.

8. The system of claim 1, wherein the capacitive strips comprise electrodes or conductive material.

9. The system of claim 1, further comprising an adhesive affixing the capacitive strips and the RFID tag to the external surface of the container.

10. The system of claim 9, wherein the adhesive comprises a copper tape covering the capacitive strips and the RFID tag.

11. The system of claim 1, wherein the RFID tag transmits the digital data to an RFID reader such that the digital data is displayable to a user to represent the sensed volume of the liquid currently held within the container.

12. The system of claim 1, wherein the RFID tag comprises at least one of: an active RFID tag, a passive RFID tag, a semi-passive RFID tag, or a battery-assisted passive (BAP) RFID tag.

13. The system of claim 1, wherein the RFID tag operates in at least one of: an Ultra-High Frequency (UHF), a High Frequency (HF), or Low Frequency (LF).

14. A system comprising:
multiple radio-frequency identification (RFID) capacitance liquid measurement and tag systems, wherein each of the multiple RFID capacitance liquid measurement and tag systems are attached to a respective container and generates data associated with detecting a volume of liquid currently held within the respective container;
one or more RFID antennas transmitting radio waves to the multiple RFID capacitance liquid measurement and tag systems and receiving radio-frequency (RF) signals transmitted from the multiple RFID capacitance liquid measurement and tag systems, wherein the RF signals communicate the data generated by the multiple RFID capacitance liquid measurement and tag systems;
a RFID reader reading the data generated by the multiple RFID capacitance liquid measurement and tag systems using the RF signals received by the one or more RFID antennas;
wherein each RFID capacitance liquid measurement and tag system comprises capacitive strips affixed to an external surface of a container holding liquid, wherein the capacitive strips are activated as a sensor sensing the volume of the liquid currently held within the respective container; and
a RFID tag coupled to the capacitive strips and affixed to the external surface of the respective container, wherein the RFID tag transmits the data corresponding to the volume of the liquid sensed by the capacitive strips.

15. The system of claim 14, wherein the RFID tag for each of the multiple RFID capacitance liquid measurement and tag systems receives the radio waves from the one or more RFID antennas to power the RFID tag.

16. The system of claim 15, wherein electric current flows through the RFID tag in response to powering the RFID tag and converts the data into the RF signals received by the one or more RFID antennas.

17. The system of claim 14, wherein the radio waves transmitted by the one or more RFID antennas locate the multiple RFID capacitance liquid measurement and tag systems.

18. The system of claim 14, further comprising:
one or more computer systems communicatively connected to the RFID reader via a communications network, wherein the one or more computer systems execute applications related to detecting volume of liquid currently held within the respective container and process the data generated by the multiple RFID capacitance liquid measurement and tag systems.

19. A method, comprising:
attaching multiple radio-frequency identification (RFID) capacitance liquid measurement and tag systems to a respective container holding liquid, wherein each of the multiple RFID capacitance liquid measurement and tag systems are configured to:
activate capacitive sensing via radio-frequency (RF) energy to sense a volume of the liquid currently held within the respective container;
transmit digital data wirelessly via RF signals, wherein the digital data corresponds to the volume of the liquid sensed by the capacitive sensing;
wherein the RFID capacitance liquid measurement and tag systems comprises capacitive strips affixed to an external surface of the respective container holding the liquid, wherein the capacitive strips are activated as a sensor sensing a volume of the liquid currently held within the container; and
a RFID tag coupled to the capacitive strips and affixed to the external surface of the respective container, wherein the RFID tag transmits the digital data corresponding to the volume of the liquid sensed by the capacitive strips.

* * * * *